(12) United States Patent
Tanaka et al.

(10) Patent No.: US 8,189,589 B2
(45) Date of Patent: May 29, 2012

(54) APPARATUS AND METHOD FOR FORWARDING PACKET DATA

(75) Inventors: Jun Tanaka, Kawasaki (JP); Hiroshi Tomonaga, Kawasaki (JP); Takashi Kuwabara, Kawasaki (JP); Hiroshi Kurosaki, Kawasaki (JP)

(73) Assignee: Fujitsu Limited, Kawasaki (JP)

( * ) Notice: Subject to any disclaimer, the term of this patent is extended or adjusted under 35 U.S.C. 154(b) by 321 days.

(21) Appl. No.: 12/405,393

(22) Filed: Mar. 17, 2009

(65) Prior Publication Data

US 2009/0245258 A1 Oct. 1, 2009

(30) Foreign Application Priority Data

Mar. 28, 2008 (JP) ................. 2008-088392

(51) Int. Cl.
*H04L 12/28* (2006.01)
*H04L 12/56* (2006.01)
(52) U.S. Cl. ........ 370/392; 370/352; 370/389; 370/390; 370/427; 370/403; 370/412; 370/429
(58) Field of Classification Search ........... 370/328–503
See application file for complete search history.

(56) References Cited

U.S. PATENT DOCUMENTS

| | | | | |
|---|---|---|---|---|
| 5,757,795 A * | 5/1998 | Schnell | ......................... | 370/392 |
| 5,923,654 A * | 7/1999 | Schnell | ......................... | 370/390 |
| 6,172,980 B1 * | 1/2001 | Flanders et al. | ............... | 370/401 |
| 6,253,334 B1 * | 6/2001 | Amdahl et al. | ..................... | 714/4 |
| 6,343,078 B1 * | 1/2002 | Bronstein et al. | ............. | 370/400 |
| 6,501,761 B1 * | 12/2002 | Pannell et al. | ................. | 370/403 |
| 6,570,875 B1 * | 5/2003 | Hegde | ............................ | 370/389 |
| 6,650,646 B1 * | 11/2003 | Galway et al. | ................. | 370/397 |
| 6,687,781 B2 * | 2/2004 | Wynne et al. | .................. | 710/317 |
| 6,959,002 B2 * | 10/2005 | Wynne et al. | .................. | 370/412 |
| 7,016,299 B2 * | 3/2006 | Kashyap | ........................ | 370/218 |
| 7,324,500 B1 * | 1/2008 | Blackmon et al. | ............. | 370/351 |
| 7,336,613 B2 * | 2/2008 | Lloyd et al. | .................... | 370/237 |
| 7,373,500 B2 * | 5/2008 | Ramelson et al. | ............. | 713/150 |
| 7,391,719 B2 * | 6/2008 | Ellis et al. | ...................... | 370/219 |
| 7,418,088 B2 * | 8/2008 | Host | ......................... | 379/106.01 |
| 7,466,703 B1 * | 12/2008 | Arunachalam et al. | ........ | 370/392 |
| 7,602,700 B1 * | 10/2009 | Bakhru | ......................... | 370/216 |
| 7,715,419 B2 * | 5/2010 | Tatar et al. | ..................... | 370/419 |
| 7,729,351 B2 * | 6/2010 | Tatar et al. | ..................... | 370/390 |
| 7,738,367 B1 * | 6/2010 | Aggarwal et al. | ............. | 370/229 |
| 7,773,536 B2 * | 8/2010 | Lloyd et al. | .................... | 370/252 |

(Continued)

FOREIGN PATENT DOCUMENTS

JP 9-224040 8/1997

(Continued)

*Primary Examiner* — Ayaz Sheikh
*Assistant Examiner* — Venkatesh Haliyur
(74) *Attorney, Agent, or Firm* — Katten Muchin Rosenman LLP

(57) ABSTRACT

An apparatus includes an input part, a plurality of output parts, and a switching part. The input part inputs a packet and builds at least one forwarding data block including a predetermined destination identifier and packet data extracted from the inputted packet. The switching part includes a forwarding destination storing section for storing, in association with a predetermined destination identifier, a forwarding destination identifier identifying one of the plurality of output parts, and receives the at least one forwarding data block from the input part, and forwards it to one of the plurality of output parts on the basis of forwarding destination storing section which is updated in response to a change in the operating state of the plurality of output parts.

10 Claims, 18 Drawing Sheets

U.S. PATENT DOCUMENTS

| | | | |
|---|---|---|---|
| 7,792,027 B2 * | 9/2010 | Tatar et al. | 370/230 |
| 7,809,009 B2 * | 10/2010 | Tatar et al. | 370/419 |
| 7,864,791 B2 * | 1/2011 | Tatar et al. | 370/419 |
| 2002/0174279 A1 * | 11/2002 | Wynne et al. | 710/113 |
| 2003/0016686 A1 * | 1/2003 | Wynne et al. | 370/412 |
| 2004/0210663 A1 * | 10/2004 | Phillips et al. | 709/230 |
| 2004/0250059 A1 * | 12/2004 | Ramelson et al. | 713/150 |
| 2004/0258226 A1 * | 12/2004 | Host | 379/106.01 |
| 2005/0060414 A1 * | 3/2005 | Phillips et al. | 709/227 |
| 2005/0060427 A1 * | 3/2005 | Phillips et al. | 709/238 |
| 2005/0089027 A1 * | 4/2005 | Colton | 370/380 |
| 2007/0064715 A1 * | 3/2007 | Lloyd et al. | 370/401 |
| 2007/0195761 A1 * | 8/2007 | Tatar et al. | 370/389 |
| 2007/0195773 A1 * | 8/2007 | Tatar et al. | 370/392 |
| 2007/0195777 A1 * | 8/2007 | Tatar et al. | 370/392 |
| 2007/0195778 A1 * | 8/2007 | Tatar et al. | 370/392 |
| 2008/0089241 A1 * | 4/2008 | Lloyd et al. | 370/253 |
| 2008/0117068 A1 * | 5/2008 | Sandstrom | 340/635 |
| 2008/0117913 A1 * | 5/2008 | Tatar et al. | 370/392 |
| 2009/0279438 A1 * | 11/2009 | Mackey et al. | 370/241 |

FOREIGN PATENT DOCUMENTS

| | | |
|---|---|---|
| JP | 2007-19831 | 1/2007 |

* cited by examiner

PHY / MAC SECTION

FORWARDING SECTION

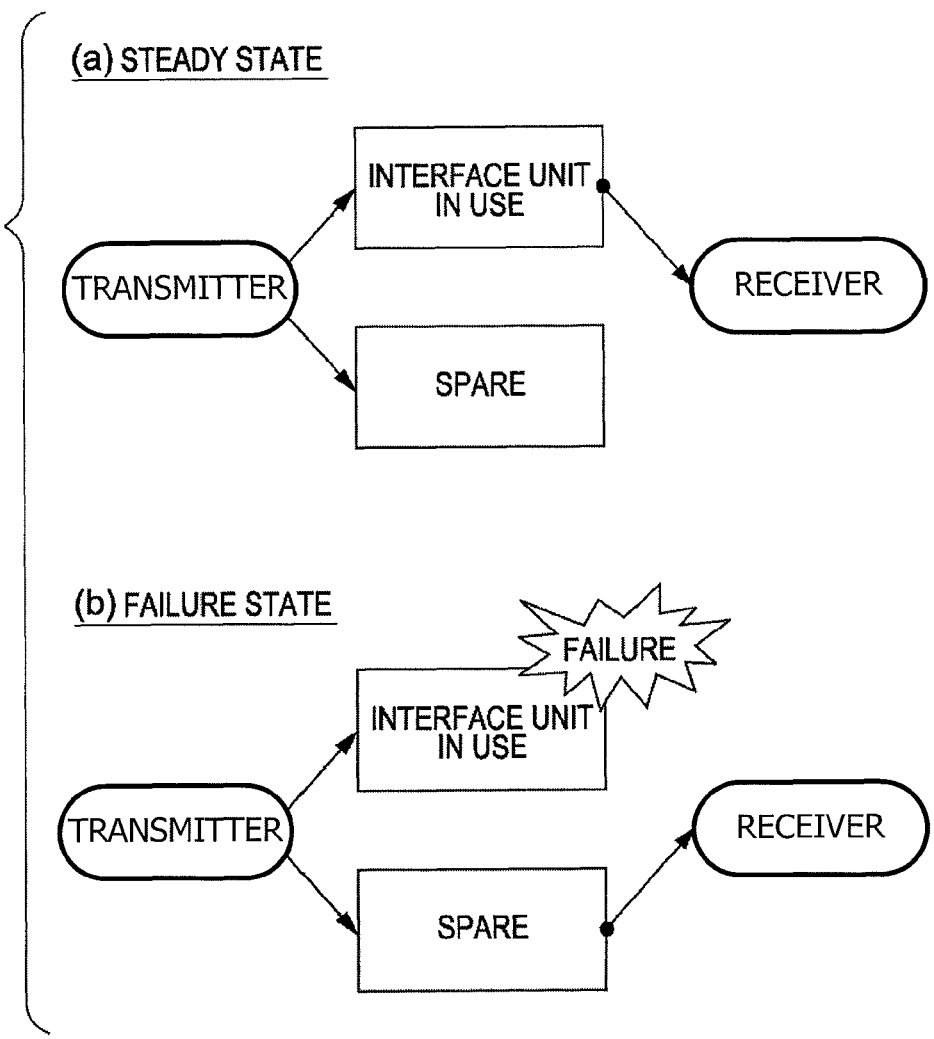

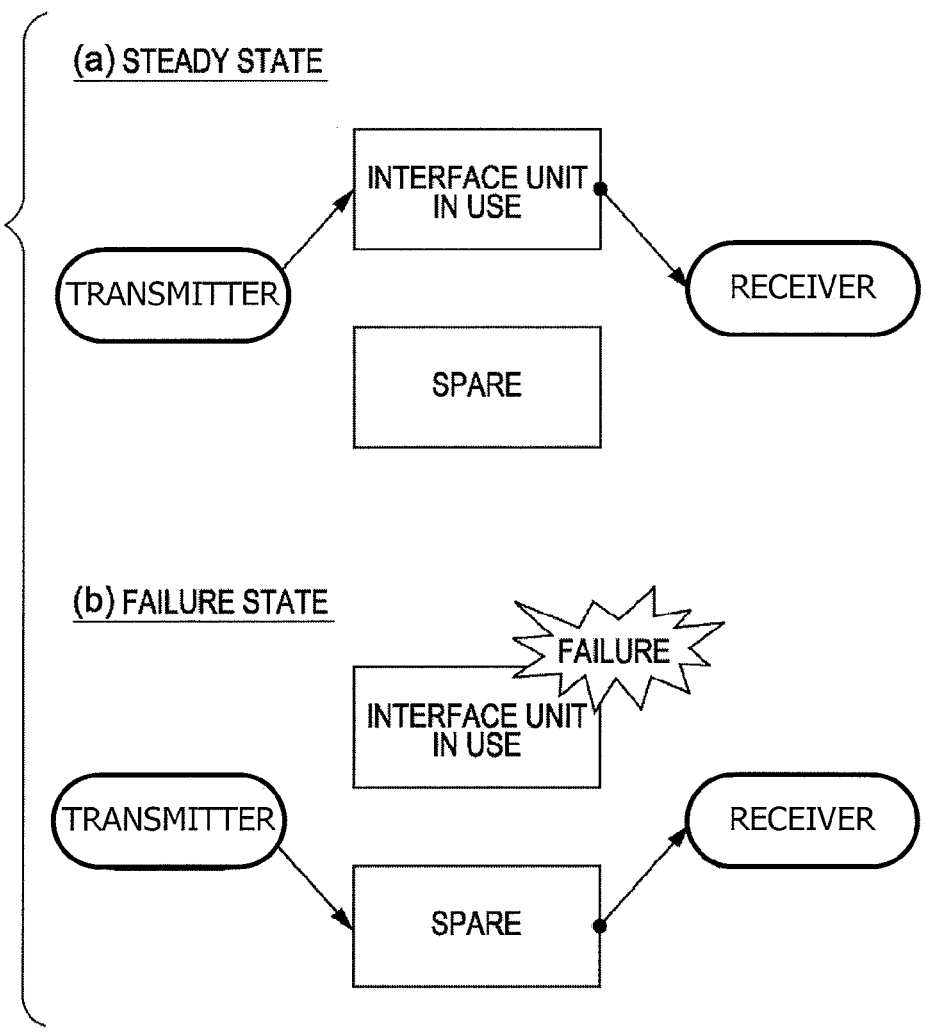

APPARATUS AND METHOD FOR FORWARDING PACKET DATA

CROSS-REFERENCE TO RELATED APPLICATIONS

This application is based upon and claims the benefit of priority of the prior Japanese Patent Application No. 2008-088392, filed on Mar. 28, 2008, the entire contents of which are incorporated herein by reference.

FIELD

The present invention relates to an apparatus and method for forwarding packet data among a plurality of input/output parts.

BACKGROUND

Packet switches (or packet transmitting apparatus) are generally classified into two categories: a pizza-box type and a chassis type.

A chassis type packet switch is a packet switch to be used by inserting, as necessary, a card-shaped unit into a chassis varying in size from around 40 cm high to more than 200 cm high. A chassis type packet switch includes circuit units each providing a function to perform interfacing, switching, or controlling (which are called interface unit, switch fabric, and control unit, respectively, and they are also called simply as cards), and a desired function can be implemented by inserting/detaching the corresponding units (or cards).

The switch configuration within a packet switch may be classified into a centralized switch and a distributed switch. A centralized switch has a switch fabric for switching among multiple interface units. A distributed switch does not have a dedicated switch fabric since the interface units thereof are connected to each other in a mesh-like fashion.

Since a chassis type packet switch allows a larger capacity configuration, it may often be used as a core packet switch of a business organization, or a packet switch in a metro/backbone area for a service provider. Therefore, sufficient availability is required for a packet switch. For this reason, each of units constituting a packet switch is generally configured to be replaceable and to continuously operate without adversely affecting services even when a failure occurs, by preparing a spare unit in advance. Hereinafter, the preparation of a spare unit in advance is called "redundancy".

FIGS. 13A, 13B, 13C are diagrams illustrating examples of redundancy methods for units. The redundancy methods for units constituting a packet switch can be roughly classified into "1+1 redundancy", "1:1 redundancy" and "1:N redundancy".

FIG. 13A is a diagram illustrating an example of a method for 1+1 redundancy. In the case of 1+1 redundancy, one spare unit is prepared for one in-use unit (or one active unit). In a steady state ((a) in FIG. 13A), a transmitter transmits, to the spare unit, information having the same content as the information held in the in-use unit, that is, information copied from the in-use unit. Therefore, the spare unit has the same information as that held in the in-use unit. A receiver selects one of the in-use unit and the spare unit, as a unit from which it will receive information. When a failure has occurred in the in-use unit ((b) in FIG. 13A), the receiver selects the spare unit and receives the information from the selected spare unit. That is, a transmitter copies information and transmits the copied information to both of the in-use unit and the spare unit while a receiver selects one of the in-use unit and the spare unit as a unit from which it will receive the information.

FIG. 13B is a diagram illustrating an example of a method for 1:1 redundancy. In the case of 1:1 redundancy, one spare unit is prepared for one in-use unit. In a steady state ((a) in FIG. 13B), a transmitter transmits information only to the in-use unit, and a receiver side receives the information from the unit in use. When a failure has occurred in the unit in use ((b) in FIG. 13B), the transmitter side changes the destination of information from the in-use unit to the spare unit, and the receiver receives the information from the spare unit. This is, a transmitter selects the destination of information while a receiver receives the information from the spare unit.

FIG. 13C is a diagram illustrating an example of a method for 1:N redundancy. In the case of 1:N redundancy, one spare unit is prepared for N in-use units. FIG. 13C illustrates a case where N=2. In a steady state ((a) in FIG. 13C), a transmitter transmits information to the corresponding in-use units, and a receiver receives the information from the corresponding unit. When a failure has occurred in one of the N in-use units ((b) in FIG. 13C), the spare unit takes over the task executed by the in-use unit in which the failure has occurred. The 1:1 redundancy can be regarded as a special case of the 1:N redundancy where N=1.

SUMMARY

According to an aspect of the invention, an apparatus includes a plurality of output parts for transmitting a packet to the communication network; an input part for receiving a packet from a communication network, the input part building at least one forwarding data block that includes a predetermined destination identifier and packet data extracted from the received packet, wherein the predetermined destination identifier is information identifying one of the plurality of output parts to which the packet data is to be forwarded when the plurality of output parts are in a predetermined operating state; and a switching part for receiving the at least one forwarding data block from the input part, and forwarding the received at least one forwarding data block to one of the plurality of output parts.

The switching part includes a forwarding destination storing section for storing, in association with a predetermined destination identifier, a forwarding destination identifier identifying one of the plurality of output parts to which the at least one forwarding data block including the predetermined destination identifier is to be forwarded; an updating section for updating the forwarding destination identifier stored in the forwarding destination storing table in response to a change in the operating state of the plurality of output parts; and a destination converting section for converting a predetermined destination identifier included in the at least one forwarding data block into a forwarding destination identifier associated with the predetermined destination identifier by referring to information stored in the forwarding destination storing section, wherein the switching part forwards the at least one forwarding data block to one of the plurality of output parts identified by the converted forwarding destination identifier included in the at least one forwarding data block.

The object and advantages of the invention will be realized and attained by means of the elements and combinations particularly pointed out in the claims.

It is to be understood that both the foregoing general description and following detailed description are exemplary and explanatory and are not restrictive of the invention, as claimed.

BRIEF DESCRIPTION OF THE DRAWINGS

FIG. 13A is a schematic diagram illustrating 1+1 redundancy;

FIG. 13B is a schematic diagram illustrating 1:1 redundancy;

DESCRIPTION OF EMBODIMENTS

Figure 14:
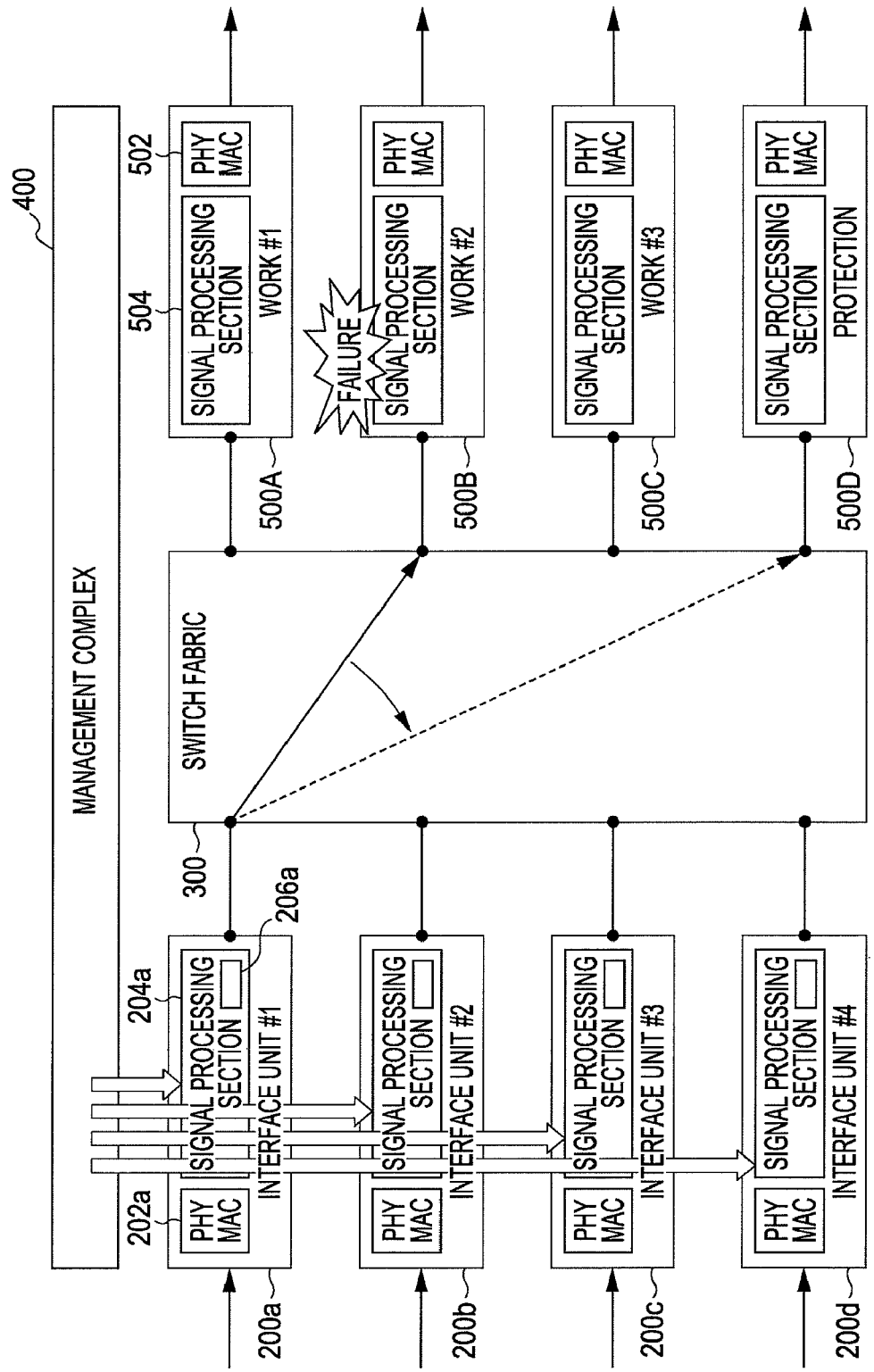
FIG. 14 is a schematic diagram illustrating a possible problem in the case where 1:N redundancy is implemented in a general chassis-based packet switch.

FIG. 14 is a diagram illustrating an example of a problem in a case where 1:N redundancy is implemented in a packet switch.

In FIG. 14, 1:N redundancy where the number of output side interface units 500 in use is 3 (that is, N=3). Output side interface units 500A, 500B and 500C are operating as in-use units (denoted by "WORK"), and an output side interface unit 500D is on standby as a spare unit (denoted by "PROTECTION").

An input side interface unit 200 has a forwarding destination solution table 206. The forwarding destination solution table 206 stores information on a forwarding destination card to which a frame is to be transferred (or information on a destination card). Herein, a forwarding destination card (or a destination card) means an output side interface unit 500. When a packet is input to the input side interface unit 200, a signal processing section 204 receives the packet through a PHY/MAC section 202, and determines the forwarding destination card (or the output side interface unit 500) to which a frame including packet data included in the received packet is to be forwarded, on the basis of the forwarding destination resolution table 206. Herein, the internal header including destination information on the forwarding destination card (or identifier identifying the forwarding destination card) is added to the frame.

In FIG. 14, the case where a frame is forwarded from the input side interface unit 200a to the output side interface unit 500B is depicted. In this case, when a failure has occurred in the output side interface unit 500B (WORK #2), a monitoring/control unit (denoted by "MANAGEMENT COMPLEX") 400 detects the occurrence of the failure.

When the monitoring/control unit 400 detects a failure in the output side interface unit 500B, the monitoring/control unit 400 causes the spare output side interface unit 500D (denoted by "PROTECTION") to take over the task executed by the in-use output side interface unit 500B in which the failure has occurred. For that purpose, it is required to rewrite the destination card information on the forwarding destination solution table 206 in each of the input side interface unit 200 so as to forward a packet to the spare output side interface unit 500D instead of the output side interface unit 500B. The monitoring/control unit 400 instructs each of the input side interface units 200 to rewrite the forwarding destination solution table 206 thereof.

Here, since there is a possibility of forwarding a frame from any one of the input side interface units 200 to the output side interface unit 500B in which the failure occurred, all of the input side interface units 200 within the packet switch must be instructed to rewrite the forwarding destination solution table 206 thereof. The instruction to rewrite the forwarding destination solution table 206 is not performed simultaneously on all of the input side interface units 200 but is performed serially one by one on each of the input side interface units 200. Therefore, as the number of input side interface units 200 increases, the time required for the processing of rewriting the forwarding destination solution tables 206 increases. As a result, there is a possibility of increasing the time from the occurrence of a failure to the recovery of a service (that is, the time from the occurrence of a failure to the completion of switching destination cards to which frames are to be forwarded).

As for equipment used as a backbone circuit by a communication carrier such as a service provider, an allowable time for an instantaneous interruption caused by a failure is, in many cases, equal to or less than 50 ms. Therefore, the increased number of input side interface units 200 requires the increase in speeds of the processing of rewriting the forwarding destination solution table 206 and the processing of switching among destination cards to which frames are to be forwarded.

Hereinafter, with reference to drawings, embodiments of the present invention will be described. The configurations of the following embodiments are examples, and the present invention is not limited to the configurations of the embodiments.

First Embodiment

Figure 1:
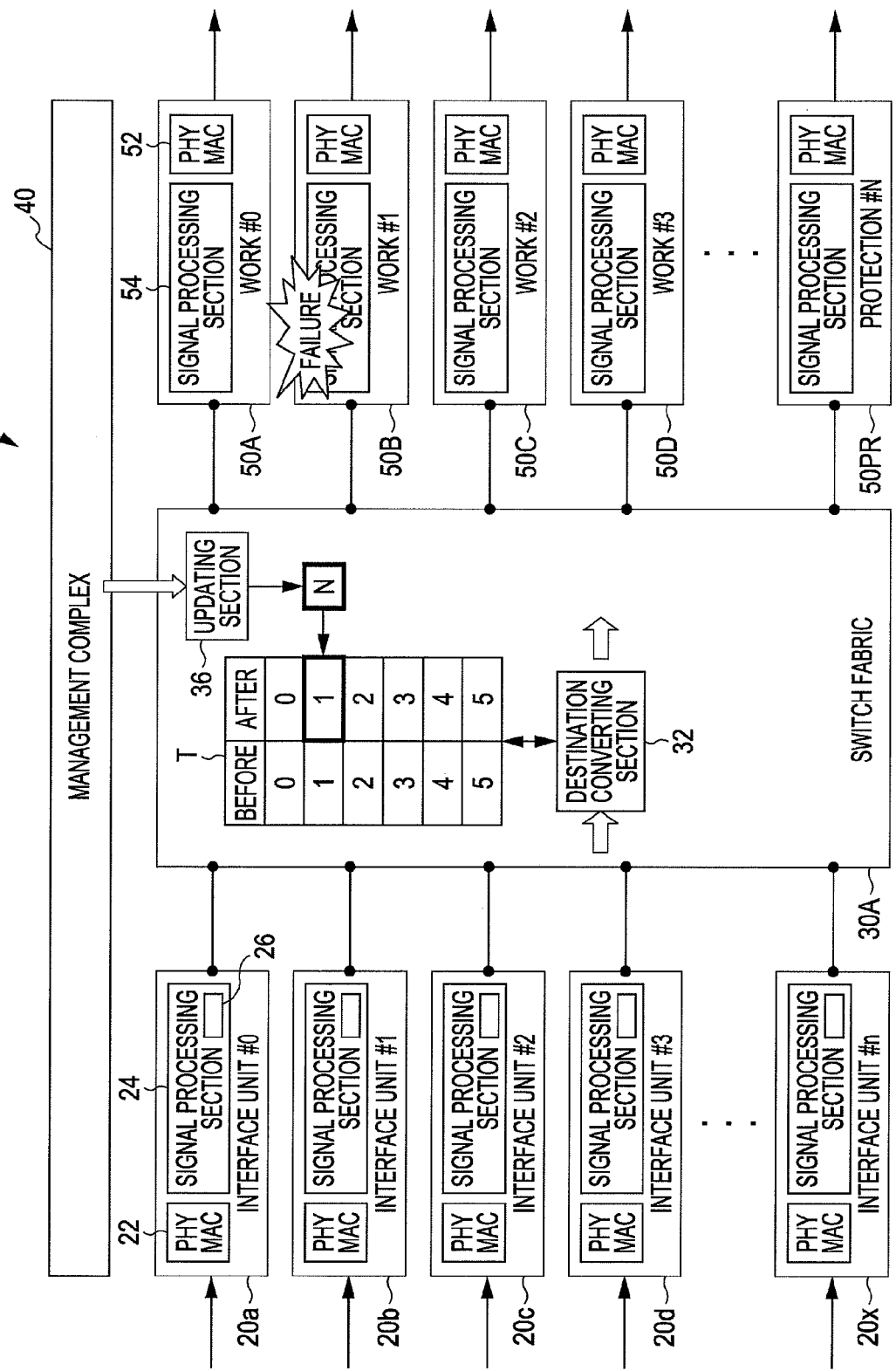
FIG. 1 is a diagram illustrating an example of a packet switch according to a first embodiment.

FIG. 1 is a diagram illustrating an example of a packet switch according to a first embodiment. A packet switch 10A includes N (an integer equal to or greater than 1)+1 input side interface units 20*a*, 20*b*, . . . , and 20*x* (which will be simply called input side interface units 20 when they are not required to handle distinctively), a switch fabric 30A, N+1 output side interface units 50A, 50B, and 50 PR, and a monitoring/control unit (denoted by "MANAGEMENT COMPLEX") 40. The monitoring/control unit 40 monitors and controls the input side interface unit 20, switch fabric 30A, and output side interface unit 50.

In the packet switch 10A, the output side interface unit 50 has a 1:N redundant configuration where the spare output side interface unit 50PR is prepared for N output side interface units 50 in use, that is, output side interface units 50A, 50B, 50C, . . . . Hereinafter, an input side interface unit and an output side interface unit will be also expressed as "an input part" and "an output part", respectively, and a switch fabric will be also expressed as "a switching part". A output side interface unit is an example of "an input part", and an input side interface unit is an example of "an input part". Although data transmitted in a communication network is in general expressed as "a frame" or "a packet" the data is hereinafter expressed as "a packet" for convenience of explanation.

The input side interface units 20 (or input part), the switch fabric 30A, the monitoring/control unit 40, the output side interface units 50 (or output part), and functional sections included therein can be implemented by circuits units including memories such as an application specific integrated circuit (ASIC), a CPU (Central Processing Unit) and a RAM (random access memory) and/or a CAM (Content Addressable Memory). The circuit units can be card-shaped.

The packet switch 10A has a chassis including multiple slots for inserting a card-shaped circuit unit (which will be hereinafter also simply called "card" or "unit"), and can be configured to exchange data blocks among the cards which are inserted in the multiple slots and electrically connected, for example, via a bus, so as to implement predetermined multiple functions required for a packet switch.

The input side interface unit 20 includes a PHY/MAC section 22 and a signal processing section 24. The PHY/MAC section 22 includes a physical layer processing section (denoted by "PHY" which stands for PHYsical layer chip) and a MAC layer processing section (denoted by "MAC" which stands for Media Access Control). The physical layer processing section PHY performs layer-1 (physical layer) termination processing on a signal input from an external line by replacing the level or code of the signal with an internal signal. The MAC layer processing section MAC performs layer-2 termination processing by recognizing frame information in the input signal and checking the normality of the frame information. The physical layer processing section PHY and MAC layer processing section MAC can be implemented by separate circuits. Hereinafter, for convenience of explanation, the physical layer processing section PHY and MAC layer processing section MAC are notated as "PHY/MAC 22", and the frame information included in an input signal will be expressed as "a packet".

The signal processing section 24 includes a forwarding destination solution table 26. The forwarding destination solution table (or Forwarding Table) 26 holds information identifying an output side interface unit 50 (which will also be called "destination card" simply) to which a frame is to be transferred. The signal processing section 24 receives a packet (or frame information) from the PHY/MAC section 22, extracts packet data from the received packet, and determines an output side interface unit 50 (destination card) to which the packet data is to be forwarded, with reference to the forwarding destination solution table 26. The signal processing section 24 adds, to the packet data, the information identifying the determined output side interface unit 50 to which the packet data is to be forwarded.

When the packet switch is an Ethernet switch, for example, the forwarding destination solution table 26 holds a destination MAC address of packet data and information identifying the output side interface unit 50 to which the packet data having the destination MAC address is to be forwarded. The forwarding destination solution table 26 may be created on the basis of a MAC address table, or a MAC address table itself may be used as the forwarding destination solution table 26. The forwarding destination solution table 26 can be stored in a recording medium such as a memory included in the input side interface unit 20.

The switch fabric 30A routes the packet data on the basis of the information that is obtained by the input side interface unit 20 and identifies the output side interface unit 50 to which the packet data is to be forwarded. The switch fabric 30A further includes a destination converting section 32, an updating section 36, and a destination conversion table T. The destination conversion table will be also expressed as "a forwarding destination storing section" or "a forwarding destination table". The functional components of the switch fabric 30A will be described later.

The output side interface unit 50 includes a signal processing section 54 and a PHY/MAC section 52. The signal processing section 54 converts packet data forwarded from the switch fabric 30A into the format to be actually output to an external line, which is further converted into the signal level and/or code suitable for being transmitted to an external line by the PHY/MAC section 52. Further, the input side interface unit 20 and the output side interface unit 50 can be implemented by the identical unit because input side and output side interface units execute the similar processing except that they have mutually inverted processing flows.

The monitoring/control unit 40 monitors the input side interface unit 20, switch fabric 30A and output side interface unit 50 and detects a change in the state thereof. The monitoring/control unit 40 manages information regarding control over the packet switch, such as information on an in-use unit and a spare unit of the in-use unit.

When the monitoring/control unit 40 detects a change in the operating state of the plurality of output side interface units 50, for example, an occurrence of a failure in the plurality of output side interface units 50, the monitoring/control unit 40 transmits a failure occurrence notification and an update instruction to the updating section 36. The failure occurrence notification includes information identifying one of the plurality of output side interface units 50 in which the failure has occurred. The update instruction is information for instructing the updating section 36 to update the destination conversion table T. The update instruction includes information identifying the spare output side interface unit 50 which functions as an alternative of the output side interface unit 50 in which the failure has occurred.

The monitoring/control unit 40, for example, transmits a notification of a failure recovery and an update instruction to the updating section 36 when the monitoring/control unit 40 detects that the output side interface unit 50 has recovered from the failure. The notification of failure recovery includes information identifying the output side interface unit 50 that has recovered from the failure. The update instruction, in this case, includes instruction for changing information identifying the spare output side interface unit 50 stored in the destination conversion table T, into information identifying the in-use output side interface unit 50 that has recovered from the failure The monitoring/control section 40, for example, can be configured to receive a keep-alive signal periodically from each of a plurality of output side interface units, and determine that a failure has occurred in a unit when the keep-alive signal is not transmitted from the unit. The monitoring/control unit 40 can be configured to determine that the unit has recovered from the failure and now be able to forward a packet when the keep-alive signal has again been received from the unit. Alternatively, a method can also be applicable in which a signal different from the keep-alive signal is used to notify the monitoring/control unit 40 that a failure has occurred in a unit or that the unit has recovered from the failure.

Further, the monitoring/control section 40 can be configured to detect, as a change in the operating state of the plurality of output side interface units 50, for example, a temporary out-of-service state of one of the plurality of output side interface units 50 for the purpose of maintenance thereof.

Figure 2A:
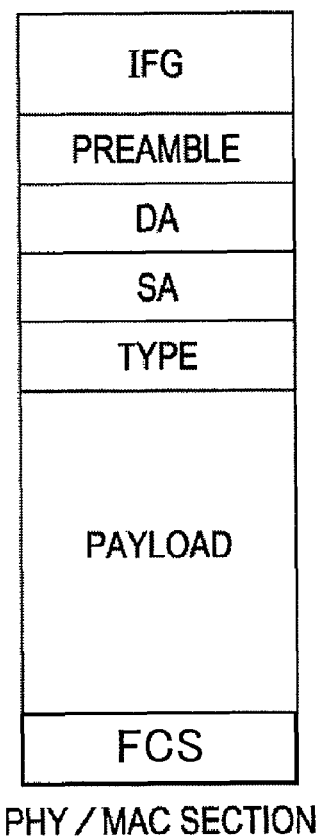
FIG. 2A is a diagram illustrating an example of a format of a packet.
Figure 2B:
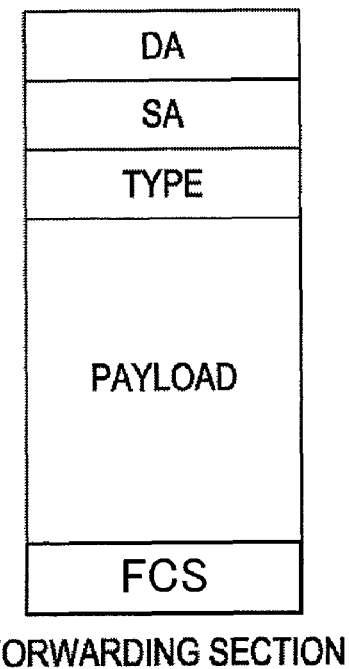
FIG. 2B is a diagram illustrating an example of a format of packet data.
Figure 2C:
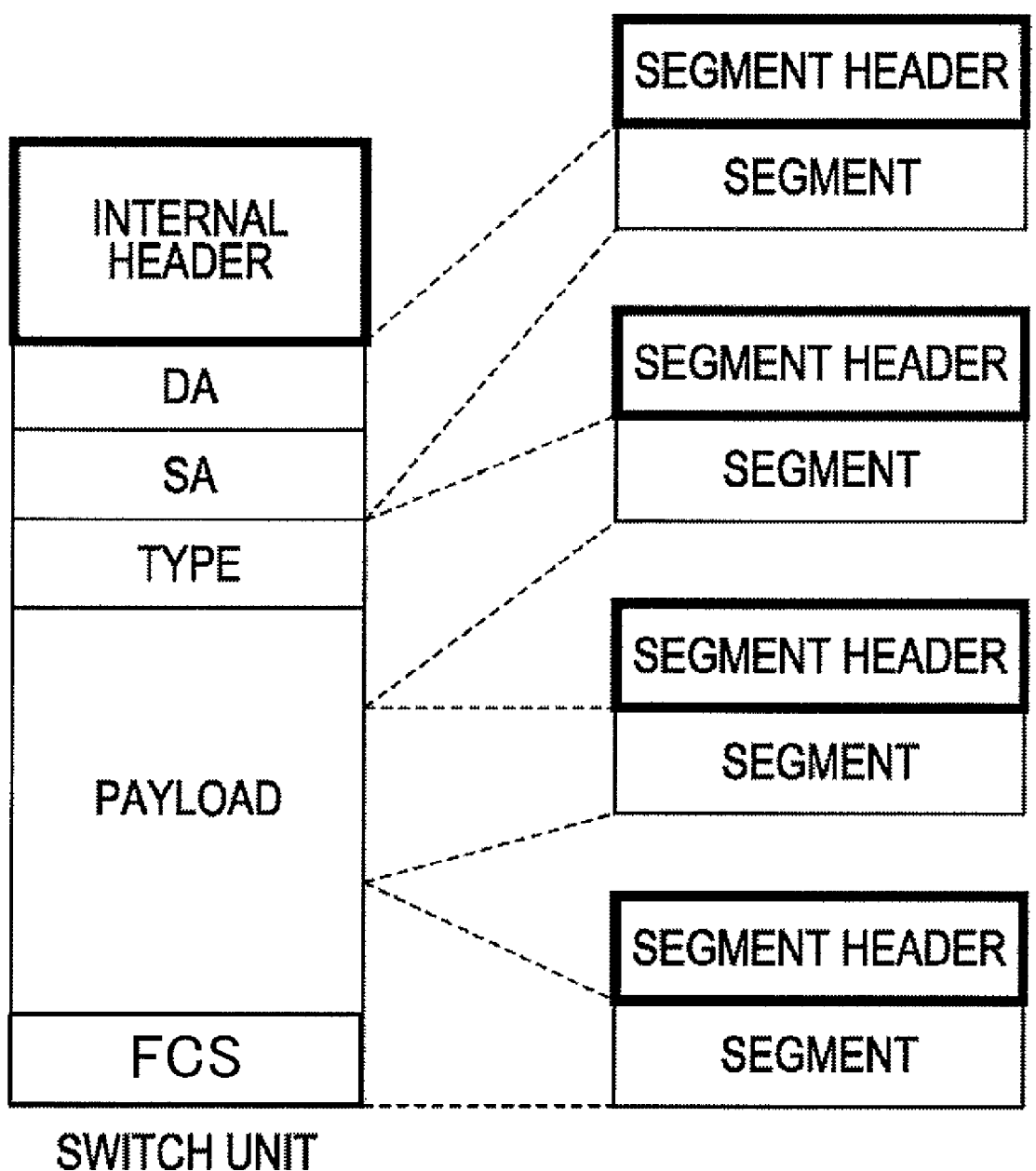
FIG. 2C is a diagram illustrating examples of formats of a forwarding data block and a sequence of forwarding data blocks, according to an embodiment.

FIGS. 2A, 2B and 2C are diagrams illustrating examples of data formats used in the units. FIG. 2A is a diagram illustrating an example of a format of a packet extracted from a signal input from an external line by the PHY/MAC section 22. The packet is transferred, in the packet format depicted in FIG. 2A, from the PHY/MAC section 22 to the signal processing section 24.

The signal processing section 24 having received a packet depicted in FIG. 2A extracts data to be forwarded (that is, packet data) from the received packet by excluding an IFG (Inter Frame Gap) and a preamble from the packet data. FIG. 2B is a diagram illustrating an example of packet data extracted by the signal processing section 24. The signal processing section 24 searches the forwarding destination solution table 26 by using the destination address (DA) of the packet data as a search key, and determines the output side interface unit 50 (destination card) corresponding to the value of the search key. For example, in the case of an Ethernet (registered trademark) switch, the signal processing section 24 extracts a destination MAC address from packet data, and determines the output side interface unit 50 corresponding to the extracted destination MAC address with reference to the forwarding destination solution table 26.

The signal processing section 24 having obtained the information identifying the destination card (destination information) adds an internal header including the destination information to the packet data depicted in FIG. 2B. FIG. 2C illustrates an example of a forwarding data block including the internal header added by the signal processing section 24. The internal header includes fields that store pieces of information on frame control, such as the destination information (denoted by "DA" in FIG. 2C) identifying the destination card (output side interface unit 50), source information (denoted by "SA" in FIG. 2C) identifying an input card (input side interface unit 20) and an input port, and a service class (denoted by "TYPE" in FIG. 2C) indicating a priority level of processing on the packet data.

FIG. 2C is a diagram illustrating an example of formats of a forwarding data block and a sequence of forwarding data blocks. On the left side of FIG. 2C, depicted is packet data provided with an internal header added by the signal processing section 24, which will be hereinafter expressed as "a forwarding data block". On the right side of FIG. 2C, depicted is a sequence of a plurality of segments of a fixed length each provided with a segment header added by the signal processing section 24, which will be hereinafter expressed as "a sequence of forwarding data blocks". In some cases, for example in the case of Ethernet, a packet switch can be configured to divide an Ethernet frame (packet) of a variable length into shorter segments of a fixed length within the apparatus, and switches each of the shorter segments. In the case, after determining a destination card (output side interface unit 50) to which packet data is to be forwarded, the packet data is divided into a sequence of segments, and a segment header including information identifying the destination card (destination information) is added to each of the sequence of segments, thereby building a sequence of forwarding data blocks which are then transmitted to the switch fabric 30A. Therefore, each of a sequence of data blocks includes a segment header and a segment that is a different part of the packet data, and the packet data can be reassembled by combining all the segments included in the sequence of data blocks in the same order as the sequence of data blocks.

Upon receiving a forwarding data block including an internal header (or a segment header), the switch fabric 30A forwards the forwarding data block to the destination card (output side interface unit 50) in accordance with the destination information of the internal header (or the segment header).

When the output side interface unit 50 receives a forwarding data block including the internal header from the switch fabric 30A, the signal processing section 54 thereof extracts the packet data from the received forwarding data block by excluding the internal header therein (or extracts a segment of the packet data by excluding the segment header), and passes the packet data (or the segment of the packet data) to the PHY/MAC section 52. When the output side interface unit 50 receives a sequence of forwarding data blocks each including a segment header from the switch fabric 30A, the signal processing section 54 thereof extracts a sequence of segments from the received sequence of forwarding data blocks by excluding a segment header from each of the sequence of forwarding data blocks, restores the packet data by combining the sequence of segments together, and passes the restored packet data to the PHY/MAC section 52. The PHY/MAC section 52 of the output side interface unit 50 performs processing as required and outputs a signal from the output port to transmit the packet including the restored packet data to a communication network.

Figure 3:
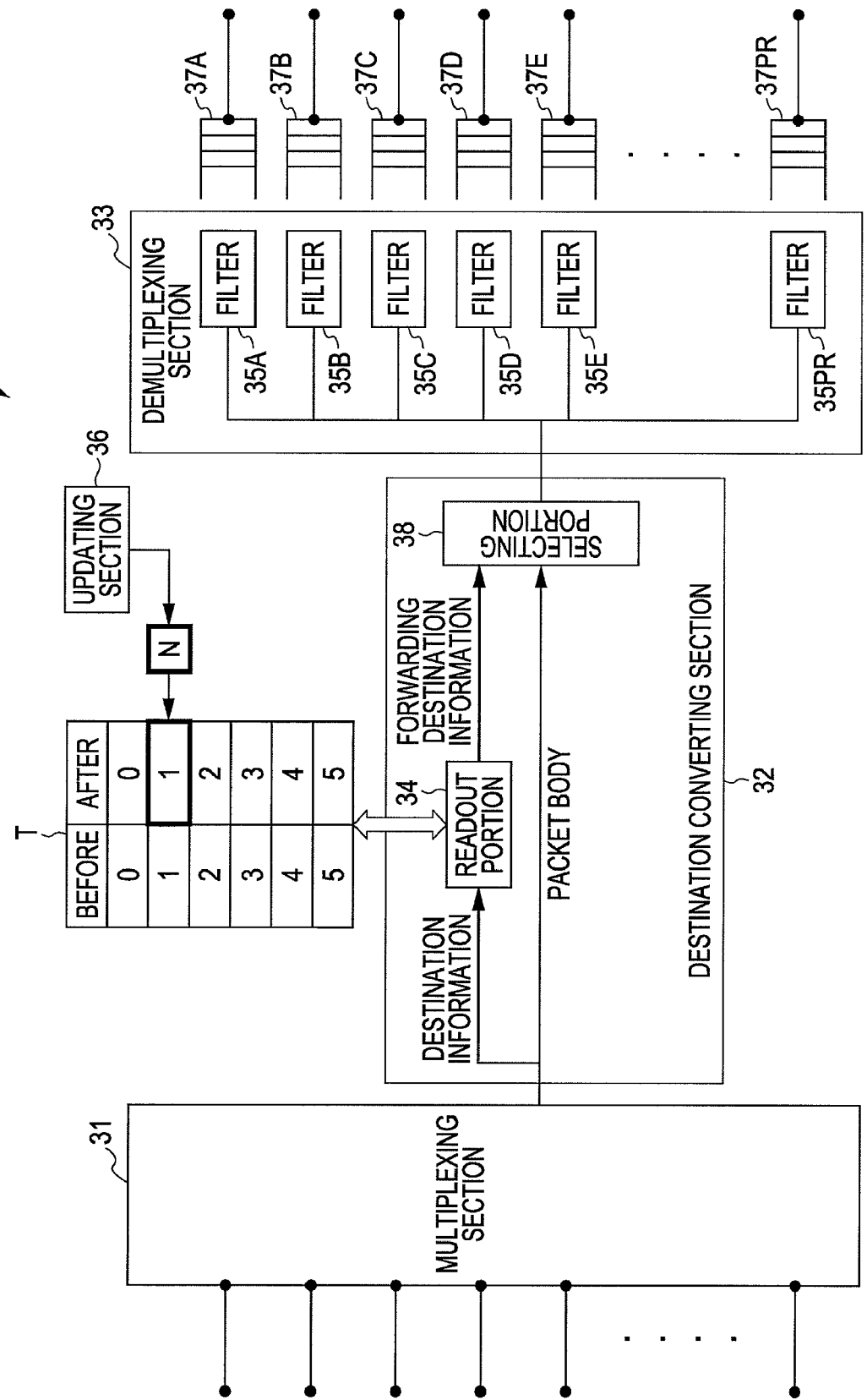
FIG. 3 is a diagram illustrating a detail configuration of a switching part, according to a first embodiment.

FIG. 3 is a diagram illustrating an example of a detailed configuration of the switch fabric 30A of the packet switch 10A. The switch fabric 30A includes a multiplexing section 31, a destination converting section 32, a demultiplexing section 33, an FIFO (or First-In, First-Out) section 37 and an updating section 36. The multiplexing section 31 multiplexes forwarding data blocks input from the input side interface unit 20 of FIG. 1. The destination converting section 32 rewrites the destination information of the internal header (or segment header) of a packet on the basis of the destination conversion table T (or the forwarding destination storing table T). The demultiplexing section 33 demultiplexes the multiplexed forwarding data blocks forwarded from the destination converting section 32. The FIFO section 37 is a buffer for transferring a forwarding data block received from the demultiplexing section 33 to the corresponding output side interface unit 50 of FIG. 1. The updating section 36 updates destination information stored in the destination conversion table T.

The destination converting section 32 includes a readout portion 34 and a selecting portion 38. The readout portion 34 accesses the destination conversion table T. The selecting portion 38 rewrites the destination information stored in an internal header on the basis of the information read out by the readout portion 34.

The destination conversion table T is stored in a storage device which is not depicted in FIG. 3. The destination conversion table T includes entries each including a pair of fields: a predetermined destination information field and a forwarding destination information field. The predetermined destination information field stores, as predetermined destination information, a predetermined destination identifier identifying one of a plurality of output side interface units to which packet data is to be forwarded when the plurality of output side interface units are in a predetermined operating state. The forwarding destination information field stores, as forwarding destination information, forwarding destination identifier identifying one of the plurality of output side interface units to which a forwarding data block including destination information identical to the predetermined destination identifier stored in the corresponding predetermined destination information field is to be forwarded. In FIG. 3, the predetermined destination information field is denoted by "BEFORE" meaning destination information of a forwarding data block before conversion thereof, and the forwarding destination information field is denoted by "AFTER" meaning destination information of a forwarding data block after conversion thereof. The destination conversion table T stores, as predetermined destination information, information identifying a "destination card" that is a forwarding destination of packet data recognized by the input side interface unit 20 of FIG. 1. The destination conversion table T stores, as the forwarding destination information, the identification information (identifier) identifying a card to which packet data is to be forwarded actually. In FIG. 3, for convenience of explanation, the predetermined destination information and forwarding destination information are represented by a brevity code, that is, a card number of each of the output side interface units, which can be, for example, an integer number starting from "0" that is assigned to the output side interface units. In the example depicted in FIG. 1, for example, "0", "1", "2", and "3" are assigned, as destination information, to the output side interface units 50A, 50B, 50C, and 50D, respectively, as described in the destination conversion table T. The destination conversion table T can be stored in a recording medium such as a memory in the switch fabric 30A.

The above mentioned predetermined operating state of the plurality of output side interface units can be, for example, a state in which there exist no failures occurring in the plurality of output side interface units. The state of the plurality of output side interface units may change into another operating state when some failures have occurred in the plurality of output side interface units, and then the forwarding destination identifier identifying the output side interface unit in which the failure has occurred can be converted to new forwarding destination identifier identifying an alternative output side interface.

Therefore, the forwarding destination information in the destination conversion table T can be set, as the initial value, at the same information as the predetermined destination information determined by the input side interface unit 20. In other words, when there exist no failures occurring in the plurality of output side interface units at the time of starting the operation of the packet switch 10A, it is not necessary to change a forwarding destination of the packet data from that determined by the input side interface unit 20 because the predetermined destination information identifies one of a plurality of output side interface units to which the packet data is to be forwarded when the plurality of output side interface units are in a predetermined operating state in which, for example, there exist no failures occurring in the plurality of output side interface units. As a result, the initial value of the forwarding destination information within the destination conversion table T can be a copy of destination information included in a forwarding data block received from an input side interface unit.

The updating section 36 receives, for example, a failure occurrence notification, a failure recovery notification, and an update instruction from the monitoring/control unit 40. For example, upon occurrence of a failure relating to the in-use output side interface unit 50 of FIG. 1, the updating section 36 receives the failure occurrence notification and update instruction from the monitoring/control unit 40. In accordance with the update instruction received from the monitoring/control unit 40, the updating section 36 updates the destination conversion table T by changing the forwarding destination identifier stored therein identifying the output side interface unit 50 in which the failure has occurred, into that identifying the spare output side interface unit 50. In other words, when the plurality of output interface units are in another state different from a predetermined state (which may be a state in which, for example, there exists a failure occurred in an output side interface unit 50), the destination conversion table T includes at least one entry in which the forwarding destination information identifies an output side interface unit (a destination card) different from that identified by the predetermined destination information.

Upon receiving a packet from the multiplexing section 31, the readout portion 34 extracts the destination information from the internal header. The readout portion 34 reads out from the destination conversion table T, forwarding destination information corresponding to the predetermined destination information that is identical to the extracted destination information. The readout portion 34 transmits the forwarding destination information read to the selecting portion 38.

The selecting portion 38 rewrites destination information of the forwarding data block received from the multiplexing section 31, which indicates one of the output side interface units 50 (destination cards), by changing predetermined destination information stored in the forwarding data block into the forwarding destination information obtained by the readout portion 34. Then, the selecting portion 38 transmits the forwarding data block having the rewritten forwarding destination information to the demultiplexing section 33. In the case, the selecting portion 38 can be configured to include a first circuit that connects the multiplexing section 31 to the demultiplexing section 33, and a second circuit that connects the readout portion 34 to the demultiplexing section 33. The packet is transmitted through the first circuit that connects the multiplexing section 31 to the demultiplexing section 33, and when the field of the forwarding data block storing the forwarding destination information is being transmitted, the first circuit is switched to the second circuit that connects the readout portion 34 and the demultiplexing section 33 (that is, the second circuit is selected), so that forwarding destination information obtained from the readout portion 34 is transmitted, as the destination information of the forwarding data block, to the demultiplexing section 33, thereby rewriting the destination information of the forwarding data block.

The demultiplexing section 33 includes filters 35 each filtering a forwarding data block transmitted from the destination conversion section 32. The filter 35 and output FIFO 37 are provided for each of the output side interface units 50. For example, the filter 35A, output FIFO 37A and output side interface unit 50A are communicably connected, and form a route through which a forwarding data block passes.

Upon receiving a forwarding data block from the selecting portion 38, the demultiplexing section 33 broadcasts the forwarding data block to forward the forwarding data block to all of the filters 35. Each of the filters 35 forwards only the forwarding data block having the internal header (or segment header) including the destination information indicating the corresponding output side interface unit 50, to the corresponding output FIFO section 37. The other forwarding data blocks are discarded because they are not required to forward to the corresponding output side interface unit 50. After that, the output FIFO section 37 having received the forwarding data block from the filter 35 of the demultiplexing section 33, for example, performs speed conversion by demultiplexing and output control on the output side interface unit 50.

Referring back to FIGS. 1 and 3, the processing of rewriting the destination information in the internal header and the processing of updating the destination conversion table T will be described in detail. In the case, it is assumed that packet data received via each of the multiple input side interface unit 20 is forwarded by the switch fabric 30A to one of the output side interface units 50 in use which is determined by the signal processing section 24 of the each of the input side interface units 20. When a failure has occurred in one of the output side interface units 50 in use, the output side interface unit 50PR functions as a spare of the output side interface unit 50 in which the failure has occurred, and takes over the functions of the output side interface unit 50 in which the failure has occurred. In this way, the packet switch 10A has the 1:N redundant configuration.

For convenience of explanation, it is assumed that, in FIG. 1, a packet (or a frame) received via the input side interface unit 20b is forwarded and transmitted from the output side interface unit 50B in use.

Upon receiving a signal, the input side interface unit 20b extracts a packet from the received signal via the PHY/MAC section 22 of FIG. 1. The signal processing section 24 further extracts packet data from the packet, and adds to the packet data the internal header including the destination information identifying the in-use output side interface unit 50 (destination card) to which the packet data is to be forwarded, by referring to the forwarding destination solution table 26. In the case, the destination information identifies the output side interface unit 50B (denoted by "WORK#1") since it is assumed that the packet data is output from the output side interface unit 50B. Hereinafter, packet data provided with the internal header will be expressed as "a forwarding data block".

Upon receiving the forwarding data block having the destination information added by the input side interface unit 20b, the switch fabric 30A multiplexes the received forwarding data block and forwarding data blocks received from other input side interface units 20 via the multiplexing section 31. When the destination converting section 32 receives the forwarding data block from the multiplexing section 31, the destination converting section 32 forwards the forwarding data block to the selecting portion 38. On the other hand, the readout portion 34 extracts predetermined destination information (for example, "WORK#1" representing the output side interface unit 50B) from the forwarding data block, and reads out, from the destination conversion table T, forwarding destination information (fort example, "WORK#1" which is denoted by the brevity code "1" in AFTER field in FIGS. 1 and 3) corresponding to the extracted predetermined destination information (for example, "WORK#1" which is denoted by the brevity code "1" in BEFORE field in FIGS. 1 and 3). Then, the readout portion 34 transmits the forwarding destination information read out from the destination conversion table T (in the case, "WORK#1") to the selecting portion 38.

The selecting portion 38 receives the forwarding data block forwarded from the multiplexing section 31 and the forwarding destination information (in the case, "WORK#1") transmitted from the readout portion 34. The selecting portion 38 change the destination information (in the case, "WORK#1") of the forwarding data block into the forwarding destination information received from the read out portion 34 (in the case, "WORK#1" identical to the destination information of the forwarding data block). After that, the forwarding data block is transmitted to the demultiplexing section 33.

The forwarding data block including the destination information "WORK#1" (representing the output side interface unit 50B) is copied in the demultiplexing section 33 and is forwarded (or broadcasted) to all of the filters 35. Because the destination information of the forwarding data block is matched with the output side interface unit 50B corresponding to the filter 35B, the filter 35B allows the forwarding data block to pass through and forwards it to the output FIFO 37B. Because the destination information of the forwarding data block (in the case, "WORK#1") is not matched with the output side interface units 50 corresponding to other filters 35 different from the filter 35B, the other filters 35 discard the forwarding data block.

The output FIFO 37B receives the forwarding data block and then outputs it to the output side interface unit 50B. In the output side interface unit 50B, the signal processing section 54 removes the internal header of the forwarding data block to obtain packet data. After that, the packet data is output to the external line through the PHY/MAC section 52 of the output side interface unit 50B.

In the case, when there exist no failures occurring in the output side interface units 50 in the packet switch 10A, the destination information of the forwarding data block set by the input side interface unit 20 and the destination information thereof rewritten by the destination converting section 32 identify the same destination card, that is, the same output side interface unit 50.

Next, in the same manner as above, a case is assumed in FIG. 1 where packet data input from the input side interface unit 20b is output from the output side interface 50B in use. It is then assumed that there exists a failure occurs in the in-use output side interface 50B.

The monitoring/control unit 40 detects that a failure has occurred in the output side interface unit 50B. Then, the monitoring/control section 40 transmits a failure occurrence notification and an update instruction to the updating section 36. The failure occurrence notification indicates that a failure has occurred in the output side interface unit 50B. The update instruction notifies the updating section 36 of information identifying the spare output side interface unit 50PR (in the case, destination information denoted by "PROTECTION #N") as information identifying an destination card alternative to the output side interface unit 50B so as to update the destination conversion table T.

Upon receiving the failure occurrence notification and update instruction from the monitoring/control section 40, the updating section 36 updates the destination conversion table T by changing the forwarding destination information denoted by "WORK#1" corresponding to the predetermined destination information denoted by "WORK#1" (representing the output side interface unit 50B) into the destination information that is denoted by "PROTECTION#N" (representing the output side interface unit 50PR) and designated by the update instruction.

Upon receiving packet data that is to be output from the output side interface unit 50B, the input side interface unit 20b adds the internal header including the destination information denoted by "WORK#1" to the packet data, thereby building a forwarding data block which is then transferred to the switch fabric 30A.

In the destination converting section 32 within the switch fabric 30A, the readout portion 34 extracts the destination information "WORK#1" from the forwarding data block, reads out, from the destination conversion table T, the forwarding destination information "PROTECTION#N" corresponding to the predetermined destination information "WORK#1" that is matched with the destination information "WORK#1" extracted from the forwarding data block, and transmits the forwarding destination information "PROTECTION#N" read out from the destination conversion table T to the selecting portion 38.

The selecting portion 38 receives both the forwarding data block and the forwarding destination information "PROTECTION#N". Then, the selecting portion 38 changes the destination information "WORK#1" stored in the internal header of the forwarding data block into the received forwarding destination information "PROTECTION#N". The forwarding data block including the changed destination information is transferred to the demultiplexing section 33.

The forwarding data block including the destination information changed by the selecting portion 38 is broadcasted by the demultiplexing section 33, passes through the filter 35PR, and is transferred from the output FIFO section 37PR to the output side interface section 50PR.

When the output side interface unit 50B afterward has recovered from the failure, the monitoring/control section 40 transmits a failure recovery notification and an update instruction to the updating section 36 upon detecting the failure recovery of the output side interface unit 50B. The failure recovery notification is information indicating that the output side interface unit 50B has recovered from the failure. The update instruction is, in this case, information that instructs the updating section 36 to update the destination conversion table T by changing the forwarding destination information "PROTECTION#N" (identifying the spare output side interface unit 50PR) corresponding to the predetermined destination information identifying the output side interface unit 50B (denoted by "WORK#1"), into "WORK#1" (identifying the output side interface unit 50B).

Upon receiving the failure recovery information and update instruction from the monitoring/control section 40, the updating section 36 updates the destination conversion table T in accordance with the received update instruction. The updating section 36 updates the destination conversion table T by changing the forwarding destination information "PROTECTION#N" (identifying the output side interface unit 50PR) corresponding to the predetermined destination information "WORK#1" (identifying the output side interface unit 50B), into "WORK#1" (identifying the output side interface unit 50B) designated by the update instruction, so that that the destination conversion table T is restored to the state in which there exist no failures occurring (as in the initial operating state). After that, the forwarding data block having the internal header to which the destination information identifying the output side interface unit 50B is set is forwarded to the outside interface unit 50B by the packet switch 10A in the same manner as the case in which there exist no failures occurring.

When a failure has occurred in the output side interface unit 50B of the packet switch, the monitoring/control section 40 sends a failure occurrence notification and an update instruction to the updating section 36. Then, the updating section 36 rewrites (or updates) the destination conversion table T in accordance with the received update instruction. By referring to the updated destination conversion table T, the destination converting section 32 rewrites the destination information of the forwarding data block that has been set by the input side interface unit 20b and identifies the output side interface unit 50B in which the failure has occurred, so that the rewritten destination information of the forwarding data block indicates the spare output side interface unit 50PR. As a result, an output side interface unit through which the packet is to be transmitted can be changed from the in-use output side interface unit to the spare output side interface unit.

In the case of an occurrence of a failure or a recovery from the failure in the output side interface unit 50B, in order to update the destination conversion table T and change a forwarding destination card to which the packet is to be transmitted, the monitoring/control section 40 only have to notify the updating section 36 about the failure occurrence or the failure recovery. Therefore, the number of destinations to which information on a failure occurrence or failure recovery within the output side interface 50B is to be sent, can be suppressed to the number of updating sections 36, thereby reducing the time required for changing the forwarding route of packet data within a packet switch.

[Operational Effects]

According to the first embodiment, by using the packet switch 10A (that is, the switch fabric 30A), when a failure has occurred in any (such as the output side interface unit 50B) of the output side interface units 50 in use, a failure notification and an instruction to update the destination conversion table T are sent from the monitoring/control unit 40 to the updating section 36. Then the updating section 36 updates (or rewrites) the forwarding destination information stored in the destination conversion table T in accordance with the received update instruction. Thus, after the destination conversion table T is updated, the destination information included in the forwarding data block that identifies the output side interface unit 50B to which the forwarding data block is to be forwarded is replaced with information identifying the spare output side interface unit 50PR that is newly designated as the forwarding destination information by the updated destination conversion table T. Thus, the output side interface unit 50 from which the packet data is to be transmitted can be changed from the in-use one to the spare one without sending the failure notification to each of the input side interface units 20. This operation can greatly reduce the number of destinations of the notification of a failure, and processing required for the failure notification is only rewriting the destination conversion table T. Therefore, the time required for switching from the in-use unit to the spare unit can be greatly reduced, thereby increasing the number of lines to be accommodated by the packet switch.

The first embodiment has been described with reference to an example in which the packet switch 10A has the 1:N redundant configuration. The first embodiment is applicable not only to the 1:N redundant configuration but also to a packet switch with a 1:1 redundant configuration or a 1+1 redundant configuration.

VARIATION EXAMPLES

In the first embodiment, the selecting portion 38 performs processing of replacing, for each forwarding data block, the destination information of the forwarding data block with the forwarding destination information received from the readout portion 34. Instead of this, the selecting portion 38 can be configured to include both a circuit (pass circuit) that allows the forwarding data block input to the selecting portion 38 to pass through as it is and a circuit (rewriting circuit) that rewrites the destination information in the internal header of the forwarding data block, and to select one of the pass circuit and rewriting circuit to forward a forwarding data block.

In this case, the selecting portion 38 compares the destination information in the internal header of a forwarding data block and the forwarding destination information received from the readout portion 34. When the destination information of the forwarding data block and the received forwarding destination information are identical, the selecting portion 38 forwards the forwarding data block to the destination card identified by the destination information of the forwarding data block without rewriting the destination information of the forwarding data block. When the destination information of the forwarding data block and the received forwarding destination information are not identical, the destination information of the forwarding data block is rewritten by replacing therewith the forwarding destination information received from the readout portion 34, and the rewritten forwarding data block is forwarded to the filters 35 of the demultiplexing section 33 that is connecting to the destination card identified by the rewritten destination information of the forwarding data block. For example, when the destination information of a forwarding data block and the received forwarding destination information are identical, the selecting portion 38 selects the pass circuit, and otherwise, the selecting portion 38 selects the rewriting circuit to rewrite the destination information in the internal header of the forwarding data block.

The destination conversion table T can be configured by using a CAM. In a case where CAM is used, only entries in which the predetermined destination information and the forwarding destination information are not identical are stored in the destination conversion table T (that is, only information on the card in which a failure has occurred is stored in the destination conversion table T). The readout portion 34 can be configured to transmit to the selecting portion 38 the forwarding destination information associated with the predetermined destination information only if there exists predetermined destination information identical to the destination information included in the internal header of a forwarding data block within the destination conversion table T, and otherwise to transmit "Null" to the selecting portion 38. When the selecting portion 38 receives forwarding destination information from the readout portion 34, the selecting portion 38 replaces the destination information stored in the internal header with the received forwarding destination information. When the selecting portion 38 receives "Null" from the readout portion 34, the selecting portion 38 allows the forwarding data block to pass through as it is. In this way, configuring the destination conversion table T by using a CAM can reduce the number of entries to be stored in the destination conversion table T.

In the first embodiment, the monitoring/control section 40 sends to the updating section 36 the failure occurrence in the output side interface unit 50 and the instruction to update the destination conversion table T. Instead of this, the updating section 36 can be configured to beforehand store information on the output side interface unit 50PR which functions as a spare of the output side interface unit 50 in use. In the case, upon detecting failure occurrence, the monitoring/control section 40 sends only the notification of the failure occurrence to the updating section 36. Upon receiving the notification of the failure occurrence from the monitoring/control section 40, the updating section 36 rewrites (or updates) the destination conversion table T by replacing the destination information of each of the entries having forwarding destination information identifying the output side interface unit 50 designated by the notification of the failure occurrence, with destination information identifying the spare output side interface unit 50PR.

Second Embodiment

Next, a second embodiment of the present invention will be described. Differences between the first and second embodiments will be mainly described and the descriptions on common points therebetween will be omitted because the second embodiment includes a configuration common to that of the first embodiment.

Some packet switches are configured to divide a variable-length packet of a large size into multiple segments and internally forward the packet data on a segment-by-segment basis (refer to the right side of FIG. 2C). Such packet switches may have following problems.

For example, it is assumed that a packet switch receives a packet and divides the packet included in the packet into five segments. In the case, the same destination information is added to all of the five segments. However, when a failure has occurred in the destination card to which the segments are to be forwarded, the destination conversion table must be rewritten (or updated). More specifically, forwarding destination information identifying the destination card in which the failure has occurred is replaced with forwarding destination information identifying a spare card. In the case, when the destination conversion table is updated at the time of completion of the processing on the second segment, the selecting portion 38 forwards the first and second segments to the destination card in which the failure has occurred and forwards the third and subsequent segments to the spare card. As a result, one group of the first and second segments and the other group of the third and subsequent segments are forwarded to different cards, respectively, although the two groups of segments constitute the same packet, thereby failing in reassembly of the original packet.

Figure 4:
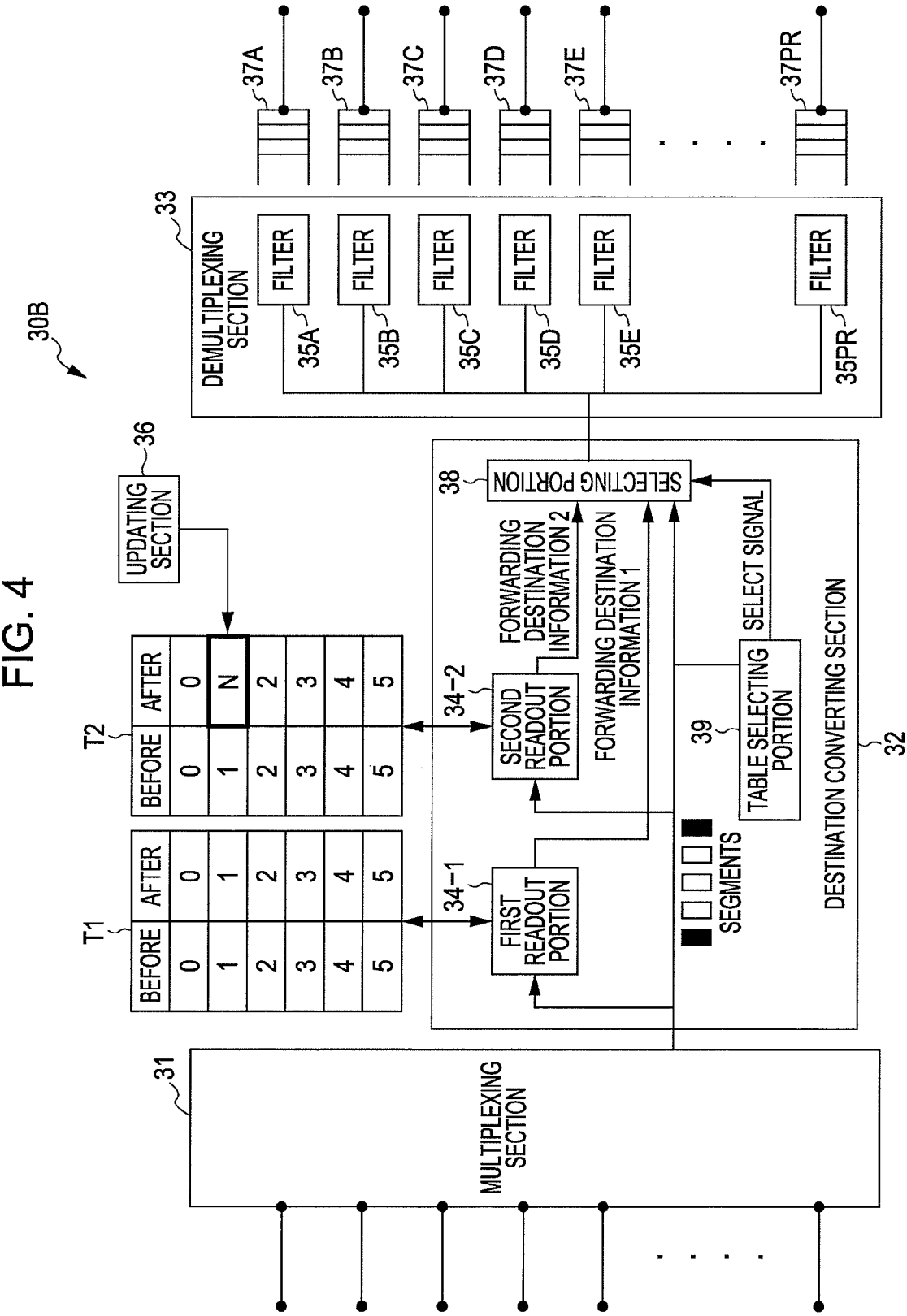
FIG. 4 is a diagram illustrating an example of a switching part of a packet switch, according to a second embodiment.
Figure 5:
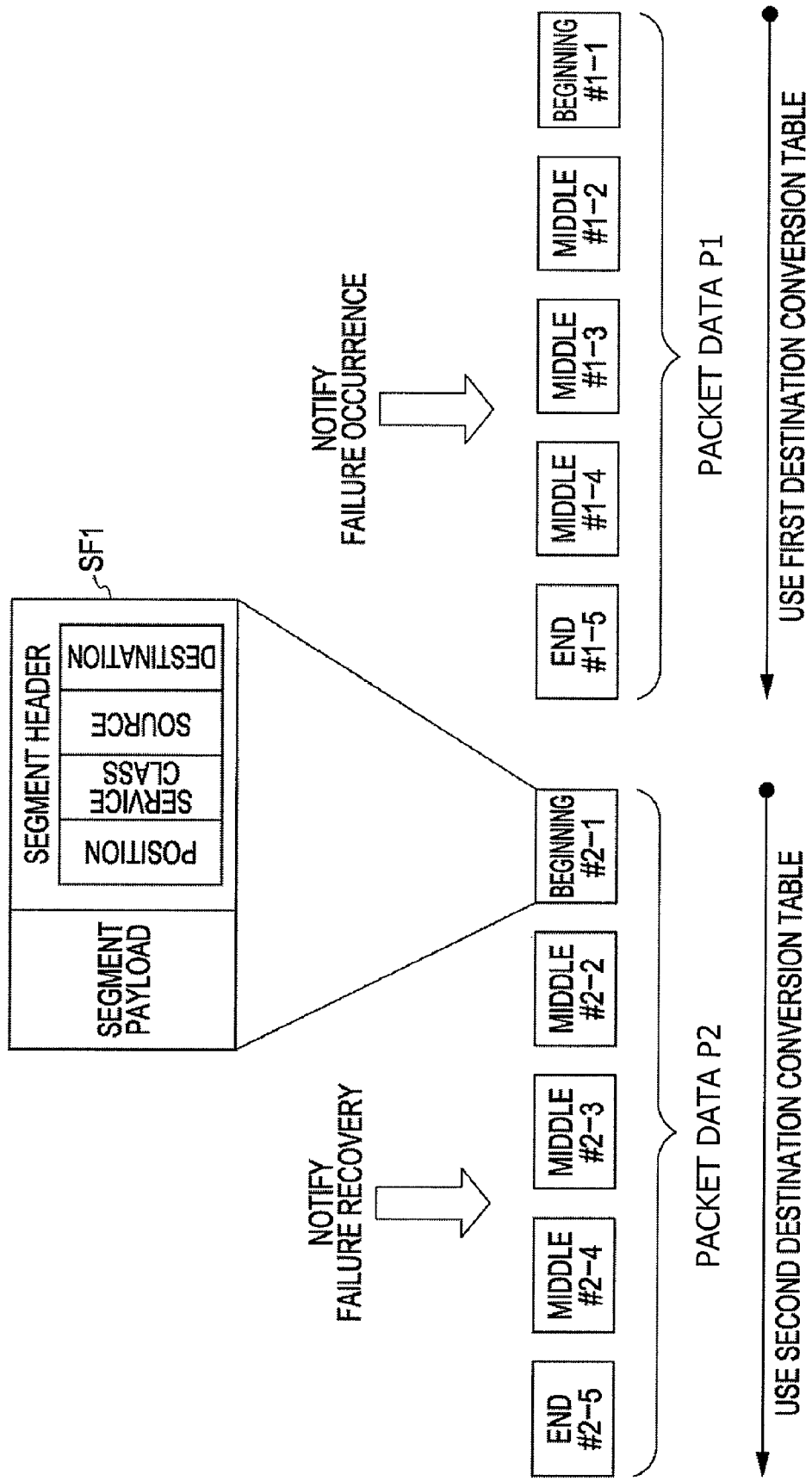
FIG. 5 is a schematic diagram illustrating an example of an operation for selecting one of a pair of destination conversion tables for each packet data in the case where a sequence of forwarding data blocks are forwarded, according to the second embodiment.

The second embodiment was made in order to suppress the possibility of the occurrence of the above mentioned problem. FIG. 4 is a diagram illustrating an example of a switch fabric of a packet switch, according to the second embodiment. FIG. 5 is a diagram illustrating an example of the selection of one of a pair of destination conversion tables for each packet data in a case where the packet data divided into a plurality of segments is forwarded.

The packet switch 10 of the second embodiment has the similar configuration as that of the first embodiment. The second embodiment is different from the first embodiment in that the packet switch 10B of the second embodiment is a packet switch that internally forwards segments resulting from the division of packet data, and the switch fabric 30B has a pair of destination conversion tables.

The switch fabric 30B includes a multiplexing section 31, a destination converting section 32, a demultiplexing section 33, an output FIFO section 37, a first destination conversion table T1 (or a first forwarding destination table) and a second destination conversion table T2 (or a second forwarding destination table). The destination converting section 32 includes a first readout portion 34-1 that accesses the first destination conversion table T1, a second readout portion 34-2 that accesses the second destination conversion table T2, a table selecting portion 39, and a selecting portion 38 that performs processing of rewriting destination information stored in a segment header of a forwarding data block.

When the input side interface unit 20 of FIG. 1 receives a packet from a communication network, the signal processing section 24 of FIG. 1 receives the packet through the PHY/MAC section 22 of FIG. 1, extracts packet data from the packet, and determines an output side interface unit 50 (destination card) to which the packet data is to be forwarded. After that, the packet is divided into segments, and a segment header including destination information is added to each of the segments, there by building a sequence of forwarding data blocks.

For example, the segment header depicted in FIG. 5 includes, like the internal header, fields that store destination information for identifying the output side interface unit 50 (destination card), source information for identifying the input card (that is, the input side interface unit 20) and the input port, and information for controlling a packet, such as a service class representing the priority level of the processing of the packet. In addition to them, the segment header includes a field that stores positional information indicating the position of the segment in the original packet data. The positional information is information indicating a relative position of a segment in a sequence of segments constituting the packet data. For example, "beginning" represents a foremost segment in the sequence of segments, "end" represents a rearmost segment in the sequence of segments, and "middle" represents an intermediate segment (refer to "POSITION" field in SF1 of FIG. 5). The packet switch 10B according to the second embodiment can be applicable not only to a packet switch that divides packet data having a size equal to or greater than a predetermined size into segments, but also to a packet switch that divides all packet data into segments.

The input side interface unit 20 is actually a card (unit) and can be configured to include multiple input ports. When multiple input ports receive packets simultaneously, the signal processing section 24 multiplexes the received data on a packet-by-packet basis, and divides packet data into segments after determining the destination card to which the packet data is to be forwarded. This can prevent the input side interface unit 20 from mixing, into the middle of a sequence of segments constituting one packet data, a segment constituting other packet data (which is packet data from other input port therein). Further, segments constituting the same packet data can be forwarded, within the packet switch 10B, without any change in the order of forwarding segments.

In each of entries included in the first destination conversion table T1, both the predetermined destination information field and the forwarding destination information field always store information identifying the same destination card. In other words, the first destination conversion table T1 keeps holding information representing a predetermined operating state of the packet switch 10B (which is, for example, a state in which there exist no failures occurring in the plurality of output side interface units), and is not rewritten.

The second destination conversion table T2 holds the same information as that of the first destination conversion table T1 (which is a copy of the first destination conversion table T1) as the initial value. The second destination conversion table T2 is updated by the updating section 36 in accordance with the change in the state of the plurality of output side interface units 50, for example, an occurrence of a failure, in the manner similar to the destination conversion table T according to the first embodiment.

The updating section 36 receives a failure occurrence notification, a failure recovery notification, and an update instruction from the monitoring/control unit 40. For example, upon receiving a failure occurrence notification indicating that a failure has occurred in the in-use output side interface unit 50 in FIG. 1, from the monitoring/control section 40, the updating section 36 updates only the second destination conversion table T2 by replacing the forwarding destination information identifying the output side interface unit 50 in which the failure has occurred, with that identifying the spare output side interface unit 50PR of FIG. 1, in accordance with the update instruction received from the monitoring/control unit 40 together with the failure occurrence notification. In the case, the updating section 36 does not update the first destination conversion table T1. When the update of the second destination conversion table T2 has completed, the updating section 36 transfers the failure occurrence notification received from the monitoring/control unit 40 to the table selecting portion 39.

The updating section 36 receives a failure recover notification and update instruction from the monitoring/control unit 40 when the output side interface unit 50 has recovered from the failure. The updating section 36 forwards the received failure recovery notification to the table selecting portion 39. Then, after a lapse of a predetermined period of time, the updating section 36 updates only the second destination conversion table T2 by replacing the forwarding destination information identifying the spare output side interface unit 50PR with that identifying the in-use output side interface unit 50 which has recovered from the failure, in accordance with the update instruction. The predetermined period of time can be set at a sufficiently longer time than the time required for switching the use of the second destination conversion table T2 to the use of the first destination conversion table T1.

The table selecting portion 39 receives a copy of each of segments to be input to the destination converting section 32 and distinguishes a beginning segment, a middle segment, and an end segment within a sequence of segments constituting the same packet data. The table selecting portion 39 sends a table selection instruction to the selecting portion 38 so as to select one of the first and second destination conversion tables (to select one of the forwarding destination information 1 or 2) on the basis of the positional information of the segment and the failure occurrence notification (or failure recovery notification) from the updating section 36. At the initial state (for example, a state in which there exist no failures occurring), the table selecting portion 39 sends to the selecting portion 38 a table selection instruction instructing the selecting portion 38 to select the first destination conversion table T1.

Figure 6:
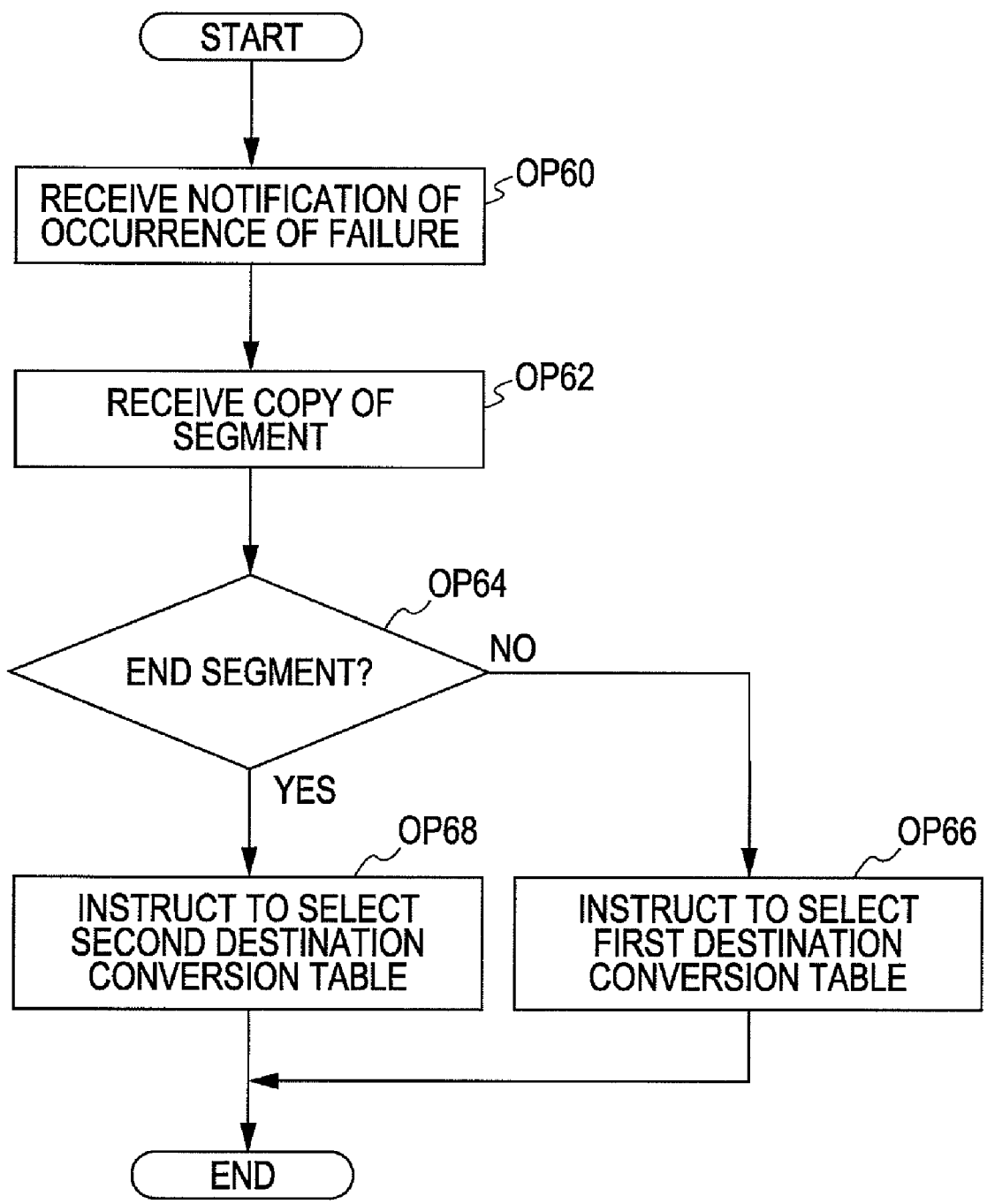
FIG. 6 is a diagram illustrating an example of a flowchart of an operation performed by a destination converting section in the case where a failure has occurred in a plurality of output parts, according to the second embodiment.

FIG. 6 is a diagram illustrating an example of operations performed by the table selecting portion 39 upon occurrence of a failure. For example, when a failure has occurred in the output side interface unit 50, the table selecting portion 39 receives a failure occurrence notification from the updating section 36 (OP60). After that, when a copy of a segment is received (OP62), it is determined whether the segment is the "end" segment of the packet data or not, on the basis of the positional information in the segment header (OP64). When the positional information of the segment header indicates "beginning" or "middle" (OP64: NO), the table selection instruction designating the selection of the first destination conversion table T1 is sent to the selecting portion 38 (OP66). When the positional information of the segment header indicates "end" (OP64: YES), the table selection instruction designating the selection of the second destination conversion table T2 is sent to the selecting portion 38 (OP66). In this case, the table selecting portion 39 sends the table selection instruction to the selecting portion 38 so that the selecting portion 38 can receive the table selection instruction during the time from completing the processing of rewriting the end segment of the packet data and before receiving the beginning segment of another subsequent packet data. For example, the table selecting portion 39 can be configured to predefine the delay time to delay the transmission of the table selection instruction by measuring the interval of the arrival of a segment to the selecting portion 38, the time required for the readout portion 34 to read out the forwarding destination information, and the time required for the selecting portion 38 to rewrite the destination information of a segment.

When the output side interface unit 50 has recovered from the failure, the table selecting portion 39 receive the failure recovery notification from the updating section 36. After that, when the positional information of the received segment is indicating "beginning" or "middle", the table selecting portion 39 sends the table selection instruction designating the selection of the second destination conversion table T2 to the selecting portion 38. When the positional information of the received segment is indicating "end", the table selecting portion 39 sends the table selection instruction designating the selection of the first destination conversion table T1 to the selecting portion 38.

In other words, when it is required to change the destination conversion tables T due to a failure occurrence or a failure recovery, the table selecting portion 39 sends, after recognizing the end segment of the packet data, to the selecting portion 38 the table selection instruction that instructs the selecting portion 38 to change the destination conversion table.

The first readout portion 34-1 extracts destination information from the segment header when a segment has arrived at the destination converting section 32. The first readout portion 34-1 reads out, from the first destination conversion table T1, a forwarding destination information 1 associated with the predetermined destination information identical to the extracted destination information. The first readout portion 34-1 transmits the read out forwarding destination information 1 to the selecting portion 38. Similarly, the second readout portion 34-2 reads out from the second destination conversion table T2 the forwarding destination information 2 which is sent to the selecting portion 38.

The selecting portion 38 holds information on the destination conversion table designated by the table selection instruction from the table selecting portion 39 (that is, information indicating which one of forwarding destination information 1 or 2 is to be selected). When the selecting portion 38 receives the segment and the forwarding destination information 1 and 2, the selecting portion 38 replace the destination information in the segment header with one of the forwarding destination information 1 or 2 designated by the table selection instruction. After rewriting the designation information of the segment, the selecting portion 38 forwards the segment to the demultiplexing section 33.

The segment is forwarded to the output side interface unit 50, through the corresponding filter 35 in the demultiplexing section 33 and the corresponding output FIFO section 37. The signal processing section 54 (depicted in FIG. 1) of the output side interface unit 50 removes the segment header and reassembles the original packet data from the sequence of segments constituting the original packet data. The reassembled packet data is properly output, as a packet, from the output port through the PHY/MAC section 52 (depicted in FIG. 1). The signal processing section 54 can determine a sequence of segments constituting the same packet data on the basis of the information in the segment header, for example, destination information, source information, and information such as a service class.

Operations by the packet switch 10B of the second embodiment will be described more specifically. It is assumed that the packet switch 10B is in a predetermined operating state, for example, in a state in which there exist no failures occurring in the plurality of output side interface units, and that the packet switch 10B is forwarding two pieces of packet data (packet data P1 and P2 in FIG. 5) that are to be forwarded from the input side interface unit 20b (depicted in FIG. 1) to the output side interface unit 50B (denoted by "WORK#1" in FIG. 1).

The input side interface unit 20b builds a sequence of data blocks by dividing the packet data P1 into a sequence of segments and adding a segment header including "WORK#1" (representing the output side interface unit B) as the destination information to each of the sequence of segments, and transfers the sequence of data blocks to the switch fabric 30B. In the case, it is assumed that the packet data P1 is divided into the sequence of segments, respectively corresponding to the sequence of data blocks #1-1 to #1-5, as depicted in FIG. 5. Similarly, it is assumed that the packet P2 is divided into segments, respectively corresponding to the sequence of data blocks #2-1 to #2-5, as depicted in FIG. 5.

In the case that there exists no failures occurring in the plurality of output side interface units 50, the table selecting portion 39 sends a table selection instruction designating the selection of the first destination conversion table T1 to the selecting portion 38. The selecting portion 38 replace the destination information of each of the sequence of data blocks with the forwarding destination information 1 obtained from the first destination conversion table T1 designated by the table selection instruction.

In the case that a failure has occurred in the output side interface unit 50B, the monitoring/control unit 40 detects it and sends a failure occurrence notification and an update instruction to the updating section 36. In this case, the update instruction designates replacement of the forwarding destination information "WORK#1" corresponding to the predetermined destination information "WORK#1#" with "PROTECTION#N". In accordance with the update instruction, the updating section 36 updates the second destination conversion table T2. The updating section 36 sends the failure occurrence notification to the table selecting portion 39 upon completing the update of the second destination conversion table T2.

Here, it is assumed that the table selecting portion 39 receives a copy of the forwarding data block #1-3 after receiving the failure occurrence notification from the updating section 36. Because the positional information in the segment header of the forwarding data block #1-3 is "middle", the table selecting portion 39 sends the table selection instruction designating the selection of the first destination conversion table T1 to the selecting section 38. Therefore, at this time, the destination conversion table is not changed from the first destination conversion table T1 to the second destination conversion table T2. The destination information of the forwarding data block #1-3 is replaced with the forwarding destination information 1 in the first destination conversion table T1.

Upon receiving a copy of the forwarding data block #1-4, the table selecting portion 39 sends the table selection instruction designating the selection of the first destination conversion table T1 to the selecting portion 38 because the forwarding data block #1-4 also has positional information "middle", like in the case where a copy of the forwarding data block #1-3 is received. The destination information of the forwarding data block #1-4 is replaced with the forwarding destination information 1 in the first destination conversion table T1.

Upon receiving a copy of the forwarding data block #1-5, the table selecting portion 39 sends the table selection instruction designating the selection of the second destination conversion table T2 to the selecting portion 38 because the forwarding data block #1-5 has positional information "end". In this case, the table selecting portion 39 sends the table selection instruction to the selecting portion 38, so that the selecting portion 38 receives the table selection instruction during the time after completion of rewriting the destination information of the forwarding data block #1-5 and before receiving the beginning forwarding data block #2-1 of the subsequent packet data P2. Because the selecting portion 38 has not yet received the table selection instruction designating the selection of the second destination conversion table T2 from the table selecting portion 39 at the time when the forwarding data block #1-5 is processed, the destination information of the forwarding data block #1-5 is replaced with the forwarding destination information 1 in the first destination conversion table T1.

The selecting portion 38 rewrites the destination information of each of the sequence of the forwarding data blocks #1-1 to #1-5 with reference to the first destination conversion table T1, and forwards them to the output side interface unit 50B (denoted by "WORK#1"). The destination information of the subsequent forwarding data blocks are rewritten by the selecting portion 38 with reference to the second destination conversion table T2 (that is, with reference to the forwarding destination information 2).

When the forwarding data block #2-1 of the packet data P2 in FIG. 5 is forwarded from the multiplexing section 31, the first readout portion 34-1 reads out, as forwarding destination information 1, "WORK#1" from the first destination conversion table T1 and sends it to the selecting portion 38. The second readout portion 34-2 reads out, as the forwarding destination information 2, "PROTECTION#N" from the second destination conversion table T2 and sends it to the selecting portion 38. The selecting portion 38 receives a table selection instruction designating the selection of the second destination conversion table T2 from the table selecting portion 39, and holds the received table selection instruction. The selecting portion 38 replaces the destination information "WORK#1" of the forwarding data block #2-1 with the forwarding destination information 2, that is, "PROTECTION#N". Then, the forwarding data block #2-1 is forwarded to the spare output side interface unit 50PR (denoted by "PROTECTION#N").

In the case of receiving a copy of the forwarding data block #2-2, the destination information thereof is replaced with the forwarding destination information 2 in the second destination conversion table T2, in the manner similar to the forwarding data block #2-1.

When the output side interface unit 50B has recovered from the failure, the monitoring/control unit 40 detects it and sends a failure recovery notification and an update instruction to the updating section 36. Upon receiving the failure recovery notification from the monitoring/control unit 40, the updating section 36 sends the failure recovery notification to the table selecting portion 39. In the case, the update instruction designates replacement of the forwarding destination information "PROTECTION#N" corresponding to the predetermined destination information "WORK#1" with "WORK#1". In accordance with the update instruction, the updating section 36 updates the second destination conversion table T2 at an appropriate time. In the case, the updating section 36 does not update the second destination conversion table T2 at the time of receiving the failure recovery notification and update instruction. That is, the updating section 36 updates the second destination conversion table T2 after a lapse of a sufficient period of time required for switching the selection of the destination conversion table from the second destination conversion table T2 to the first destination conversion table T1. Here, it is assumed that the selecting section 39 receives a copy of the forwarding data block #2-3 after receiving the failure recovery notification from the updating section 36. Because the positional information in the segment header of the forwarding data block #2-3 is "middle", the table selecting portion 39 sends the table selection instruction designating the selection of the second destination conversion table T2 to the selecting portion 38. Therefore, the destination conversion table to be used is not changed from the second destination conversion table T2 to the first destination conversion table T1. The destination information of the forwarding data block #2-3 is replaced with the forwarding destination information 2 in the second destination conversion table T2.

Upon receiving a copy of the forwarding data block #2-4, the table selecting portion 39 sends the table selection instruction designating the selection of the second destination conversion table T2 to the selecting portion 38 because the forwarding data block #2-4 also has positional information "middle", in the manner similar to the case of receiving a copy of the forwarding data block #2-3. The destination information of the forwarding data block #2-4 is replaced with the forwarding destination information 2 in the second destination conversion table T2.

Upon receiving a copy of the forwarding data block #2-5, the table selecting portion 39 sends the table selection instruction designating the selection of the first destination conversion table T1 to the selecting portion 38 because the forwarding data block #2-5 has positional information "end". In the case, the table selection instruction is transmitted to the selecting portion 38 so that the selecting portion 38 receives the table selection instruction during the time after completion of rewriting the destination information of the forwarding data block #2-5 and before receiving the beginning forwarding data block of the subsequent packet. Because the selecting portion 38 has not received the table selection instruction designating the selection of the first destination conversion table T1 from the table selecting portion 39 at the time of processing the forwarding data block #2-5, the destination information of the forwarding data block #2-5 is replaced with the forwarding destination information 2 in the second destination conversion table T2.

The selecting portion 38 rewrites the destination information of the forwarding data blocks #2-1 to #2-5 of the packet data P2 with reference to the second destination conversion table T2, and forwards them to the spare output interface unit 50PR (denoted by "PROTECTION#N"). The selecting portion 38 rewrites destination information of the subsequent forwarding data blocks with reference to the first destination conversion table T1 (that is, with reference to the forwarding destination information 1). After that, the updating section 36 updates the second destination conversion table T2 in accordance with the update instruction from the monitoring/control section 40.

The above mentioned control over timings of transmitting table selection instructions by the table selecting portion 39 allows the selecting portion 38 to keep selecting the first destination conversion table T1 until forwarding of the sequence of forwarding data blocks constituting the packet data P1 completes even if a failure has occurred in the output side interface unit 50B during the forwarding process thereof. All of the sequence of forwarding data blocks constituting the packet data P1 are forwarded to the output side interface unit 50B (denoted by "WORK#1"). Therefore, when there exists a failure occurring in the output side interface unit 50B that does not affect the function for receiving forwarding data blocks, the output side interface unit 50B can receive all of the forwarding data blocks constituting the packet data P1, and, by temporarily holding them, reassemble the packet data to transmit it upon recovery from the failure. When the interface unit itself does not function at all, the sequence of forwarding data blocks #1-4 and #1-5 in FIG. 5 cannot be received, and the packet data P1 will not be reassembled and will be discarded. The discarded packet P1, for example, may be retransmitted by the input side interface unit.

When the output side interface unit 50B has recovered from the failure, the selecting portion 38 keeps selecting the forwarding destination information 2 in the second destination conversion table T2 until the forwarding of the sequence of forwarding data blocks constituting the packet data P2 completes, like the case of failure occurrence. Therefore, all of the sequence of forwarding data blocks constituting the packet P2 are forwarded to the spare output side interface unit 50PR (denoted by "PROTECTION#N"). In the case, since no failures are occurring in the spare output side interface unit 50PR, the output side interface unit 50PR reassembles the original packet data P2 to output. In the case of the packet switch 10A of the first embodiment, the forwarding data blocks #2-1 through #2-3 corresponding to the packet data P2 are forwarded to the spare output side interface unit 50PR while the forwarding data blocks #2-4 and #2-5 are forwarded to the in-use output side interface unit 50B. Therefore, there is a possibility that the packet data P2 may not be reassembled and be discarded.

[Operational Effects]

The second embodiment can reduce the time required for switching from a in-use unit to a spare unit, like the first embodiment. Further, according to the second embodiment, the first and second destination conversion tables are provided and selection thereof is controlled on a packet-by-packet basis, that is, selection thereof is fixed during processing on a sequence of forwarding data blocks constituting one packet, thereby reducing the possibility that the packet is not reassembled and is discarded due to a change of the forwarding destination card, to which each of the sequence of forwarding data blocks is forwarded, during the processing on the sequence of forwarding data blocks constituting the same packet.

First Variation Example

According to the second embodiment, upon receiving a failure occurrence notification, the table selecting portion 39 changes the destination conversion table by a table selection instruction after confirming the reception of a copy of the end segment. Instead of this, the destination conversion table can be changed by a table selection instruction after confirming the reception of a copy of the beginning segment. In this case, the table selecting portion 39 sends a table selection instruction to the selecting portion 38 so that the selecting portion 38 receives the table selection instruction before receiving the forwarding destination information 1 and 2 from the first and second readout portions 34.

Second Variation Example

Second embodiment includes the configuration in which the failure occurrence or failure recovery of the output side interface unit 50 causes updating section 36 to update the second destination conversion table T2. Instead of this, following configuration may be adopted.

Information identifying the spare output side interface unit 50PR (PROTECTION#2) is set to all forwarding destination information corresponding to the predetermined destination information in the second destination conversion table T2. When a failure has occurred in one of the in-use output side interface unit 50, upon receiving a failure occurrence notification through the updating section 36, the table selecting portion 39 sends to the selecting portion 38 a table selection instruction designating the change of selection of a destination conversion table from the first destination conversion table T1 to the second destination conversion table T2. In the case, the updating section 36 does not update the second destination conversion table T2.

The table selecting portion 39 receives the failure occurrence notification or failure recovery notification from the updating section 36 and holds information identifying the output side interface unit 50 included therein. Upon receiving a copy of a forwarding data block after receiving the failure occurrence notification or failure recovery notification from the updating section 36, the table selecting portion 39 determines whether the destination information stored in the segment header of the forwarding data block matches with the held information identifying the output side interface unit 50 in which the failure has occurred (or the failure has been recovered). When the destination information stored in the segment header matches with the held information identifying the output side interface unit 50, it is determined whether the positional information of the forwarding data block is "beginning" or not. When the forwarding data block is the beginning of the sequence of forwarding data blocks, the table selection instruction designating the selection of the second destination conversion table T2 is sent to the selecting portion 38 so as to reach the selecting portion 38 before the forwarding destination information 1 and 2 arrive thereat.

Thereafter, upon receiving a forwarding data block having the destination information matched with the held information identifying the output side interface unit 50 (or when the table selecting portion 39 receives a copy of the forwarding data block destined to the output side interface unit 50 in which the failure has occurred), the table selecting portion 39 sends to the selecting portion 38 the table selection instruction designating the selection of the second destination conversion table T2. Upon receiving a forwarding data block having the destination information not matched with the held information identifying the output side interface unit 50 (or when the table selecting portion 39 receives a copy of the forwarding data block destined to an output side interface unit 50 other than the output side interface unit 50 in which the failure has occurred), the table selecting portion 39 sends to the selecting portion 38 the table selection instruction designating the selection of the first destination conversion table T1.

In this way, only the forwarding data blocks having the destination information identifying the output side interface unit 50 in which the failure has occurred can be forwarded to the spare output side interface unit 50PR, by replacing the destination information of the forwarding data block with the forwarding destination information 2 stored in the second destination conversion table T2. The destination information of the other forwarding data blocks is replaced with the forwarding destination information 1 in the first destination conversion table T1.

Third Variation Example

According to the second embodiment, each of a pair of destination conversion tables has its own role such that the first destination conversion table T1 is selected at a normal state (in which there exist no failures occurring) and the second destination conversion table T2 is selected when a failure has occurred. Instead of this, the following configuration may be adopted.

The updating section 36 holds information on the currently selected (or used) destination conversion table. For example, here, it is assumed that the first destination conversion table T1 is being selected. Upon receiving a failure occurrence notification or failure recovery notification from the monitoring/control section 40, the updating section 36 updates the destination conversion table which is not currently used (that is, in the case, the second destination conversion table T2). Upon completing the update, the updating section 36 sends to the table selecting portion 39 the update completion notification indicating the completion of updating the destination conversion table. The table selecting portion 39 sends the table selection instruction (which is, in the case, the instruction designating the selection of the second destination conversion table T2) to the selecting portion 38, like the second embodiment. The updating section 36 holds information on the second destination conversion table T2 as a currently selected destination conversion table.

The updating section 36 performs processing of updating the other destination conversion table (in the case, the first destination conversion table T1) after a lapse of the sufficient period of time required for changing the selection of the destination conversion table. At that time, both of the first and second destination conversion tables have the same information and are matched with each other.

Upon recovery from the failure, the destination conversion table which is not currently used (in the case, the first destination conversion table T1) is updated in the same routine as that upon occurrence of a failure. The other destination conversion table (in the case, the second destination conversion table T2) is updated after a lapse of the sufficient period of time required for changing the selection of the destination conversion table.

In this way, the change in state of one of the plurality of output side interface units 50 triggers the change of selection of a destination conversion table from the first destination table T1 to the second destination conversion table T2 or from the second destination conversion table T2 to the first destination conversion table T1. This allows efficient switching between the pair of destination conversion tables when there exist multiple groups each configured in N:1 redundancy (a case where multiple spare cards are provided, for example, the case where the output side interface unit 50PR is provided as a spare card for the output side interface unit 50A-C and the output side interface unit 50Y is provided as a spare card for the output side interface unit 50D-F).

Third Embodiment

Figure 7:
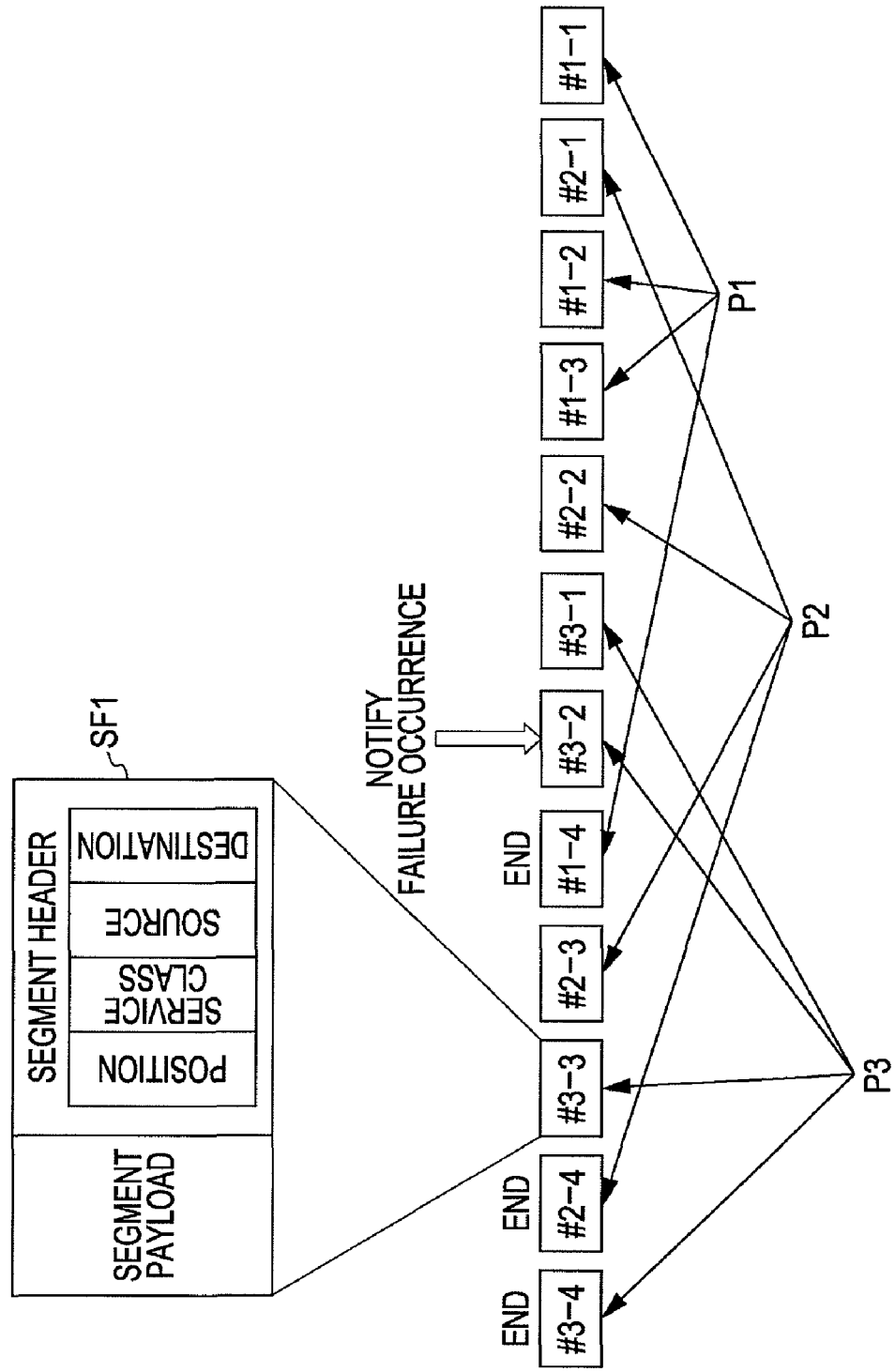
FIG. 7 is a schematic diagram illustrating an example of multiple sequences of forwarding data blocks multiplexed by a multiplexing section in the case where a plurality of input parts receives multiple packets simultaneously.

FIG. 7 is a diagram illustrating an example of forwarding data blocks multiplexed by the multiplexing section 31 in the case where multiple input side interface units 20 input packets simultaneously. Because forwarding data blocks input to the switch fabric 30 are multiplexed by the multiplexing section 31, a sequence of forwarding data blocks constituting packet data P1 are not always forwarded serially as depicted in FIG. 5. For example, in the case where four input side interface units 20 (or input cards) are used (indicated as "INPUT 0" to "INPUT 3") and the switch fabric 30 receives forwarding data blocks substantially simultaneously from all of the four input cards, a series of forwarding data blocks in which a sequence of forwarding blocks constituting a packet are interposed by another sequence of forwarding data blocks constituting another packet may be forwarded to the destination converting section 32, as depicted in FIG. 7. FIG. 7 illustrates a state in which forwarding data blocks constituting three packets are mixed as a result of the multiplexing section 31 multiplexing three sequences of forwarding data blocks that have been received from the input cards 1, 2 and 3, and constitute three pieces of packet data P1, P2 and P3, respectively. Here, it is assumed that the three pieces of packet data P1 to P3 are to be forwarded to the same output side interface unit 50 (or output card).

In the packet switch 10B according to the second embodiment, when a failure has occurred in the output side interface unit 50B to which the three pieces of packet data P1 to P3 are to be forwarded, the table selecting portion 39 receives the failure occurrence notification from the monitoring/control section 40 through the updating section 36. For example, it is assumed here that the table selecting portion 39 has received the failure occurrence notification from the updating section 36 while receiving and processing a copy of the forwarding data block #3-2 as depicted in FIG. 7.

Upon receiving a copy of the end forwarding data block #1-4 of the packet data P1 which is subsequent to the forwarding data block #3-2, the table selecting portion 39 sends a table selection instruction designating the selection of the second destination conversion table T2 (FIG. 4) to the selecting portion 38. The selecting portion 38 replaces the destination information of the forwarding data block #1-4 and subsequent forwarding data blocks with the forwarding destination information 2 stored in the second destination conversion table T2.

As a result, the forwarding data blocks #1-1 to #1-4 constituting the packet P1 are all forwarded to the same output side interface unit 50B. However, the forwarding data blocks of the packet data P2 and P3 are separated into two forwarding data block groups by a boundary of the forwarding data block #1-4 (which is the end forwarding data block of the packet data P1), that is, a first group of forwarding data blocks to be forwarded to the output side interface unit 50B and a second group of forwarding data blocks to be forwarded to the spare output side interface unit 50PR (FIG. 1). Because a destination conversion table is changed before the end forwarding data blocks of the packet data P2 and P3 are recognized, for example, the forwarding data blocks #2-1 and #2-2 of the packet data P2 may be forwarded to the output side interface unit 50B, and the forwarding data blocks #2-3 and #2-4 thereof are forwarded to the spare output side interface unit 50PR. The same is true for the packet data P3. In this way, the forwarding data blocks constituting the same packet data may be forwarded to different output side interface units, precluding the packet data P2 and P3 from being reassembled. As a result, the packet data P2 and P3 may be discarded.

Figure 8:
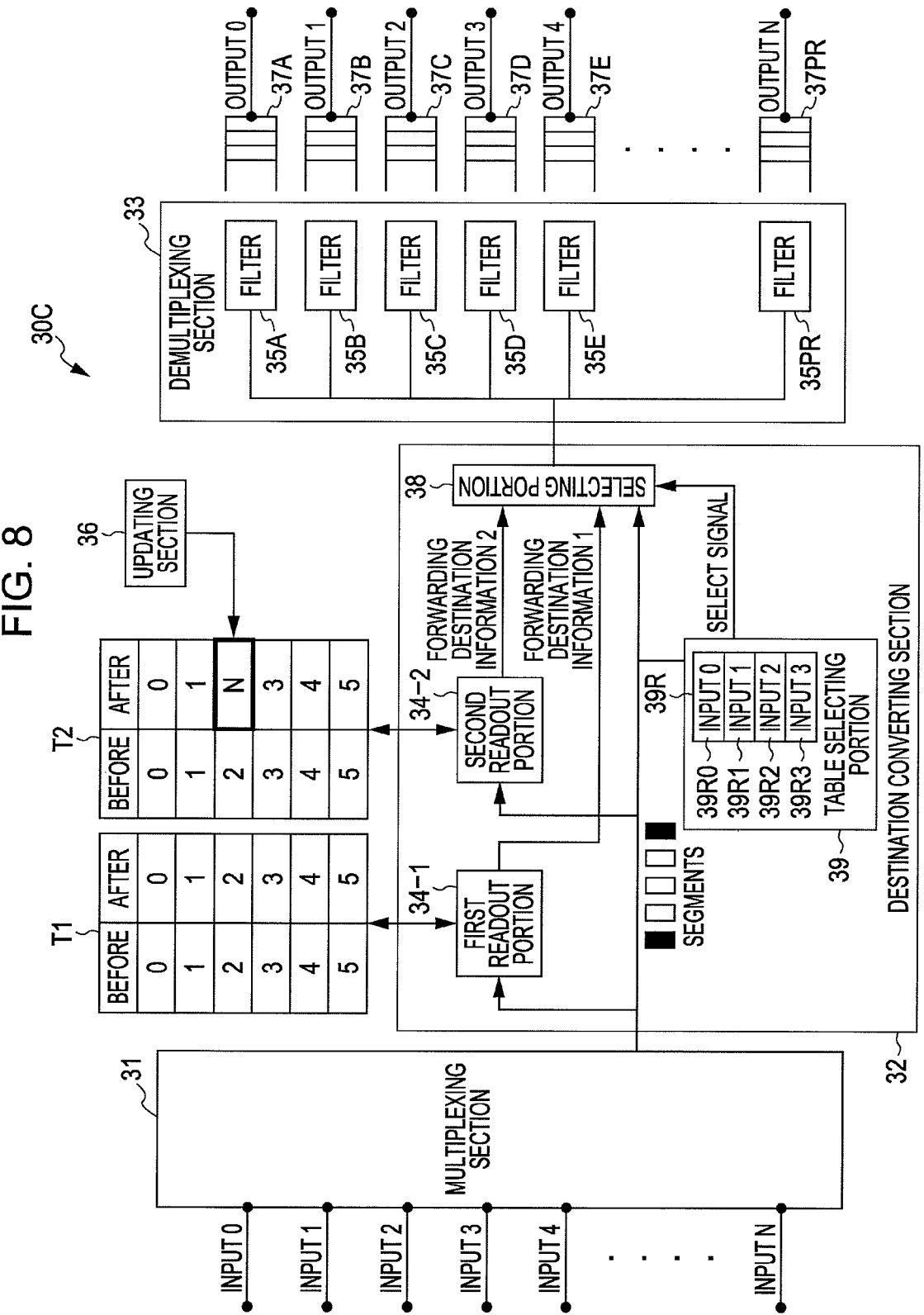
FIG. 8 is a diagram illustrating an example of the detail configuration of a switching part of a packet switch according to a third embodiment.

A third embodiment was made in order to suppress the possibility of occurrence of the problem mentioned above. FIG. 8 is a diagram illustrating an example of a switch fabric 30C included in a packet switch 10C, according to the third embodiment. The packet switch 10C further includes the table selecting portion 39 that has a function of transmitting a table selection instruction for controlling the selection of a destination conversion table for each of the plurality of input side interface units from which a forwarding data block is received, in addition to the functions of the packet switch 10B of the second embodiment. The descriptions on the parts common to those of the second embodiments will be omitted hereinafter, for convenience of explanation.

The table selecting portion 39 includes a table information storage section 39R for each of the plurality of input side interface units 20. The table information storage section 39R holds information identifying a destination conversion table to be used for rewriting the destination information of a forwarding data block received from the corresponding input side interface unit 20 (or input card). For example, in the case where the selecting portion 38 uses the first destination conversion table T1 to rewrite the destination information of the forwarding data block received from the input side interface unit 20*a* (which is "INPUT 0" in FIGS. 1 and 8), the table information storage section 39R0 stores information identifying the "first destination conversion table T1". A memory such as a register is applicable as the table information storage section 39R.

Figure 9:
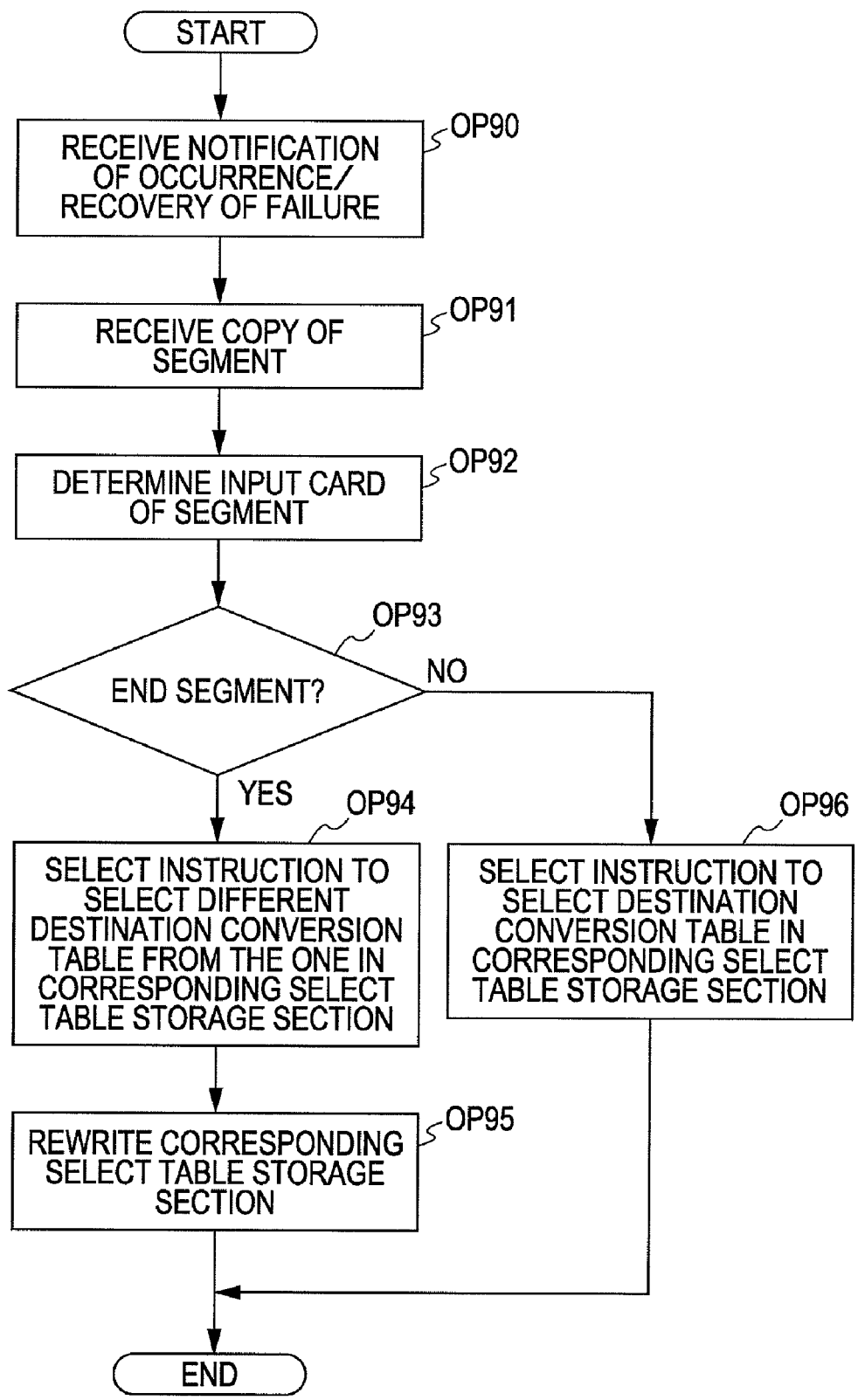
FIG. 9 is a diagram illustrating an example of a flowchart of an operation performed by the switching part of the packet switch according to the third embodiment.

FIG. 9 is a diagram illustrating an example of an operation of a table selecting portion 39 upon occurrence of a failure. When there exist no failures occurring in any of the plurality of output side interface units 50 of the packet switch 10C, the first destination conversion table T1 is selected. Therefore, each of the table information storage sections 39R stores information identifying the first destination conversion table T1.

For example, when a failure has occurred in the output side interface unit 50B (FIG. 1), the table selecting portion 39 receives a failure occurrence notification from the updating section 36 (in step OP90). When a copy of a forwarding data block is received after that (in step OP91), the input side interface unit 20 (or input card) is identified from the source information in the segment header (in step OP92). Here, it is assumed that the source information in the segment header is identifying "input side interface unit 20*b*", for example.

Next, it is determined whether the forwarding data block is the "end" forwarding data block or not on the basis of the positional information in the segment header (in step OP93). When the positional information in the segment header is "beginning" or "middle" (NO in step OP93), the destination conversion table stored in the table information storage section 39R1 corresponding to the input side interface unit 20*b* is selected (in step OP96). Because the table information storage section 39R1 stores the "first destination conversion table T1", for example, the table selection instruction is transmitted to the selecting portion 38 that designates the selection of the "first destination conversion table T1" for rewriting the destination information of the forwarding data block having the source information identifying the "input side interface unit 20*b*".

When the positional information in the segment header is "end" (YES in step OP93), table selecting portion 39 selects the other destination conversion table different from the destination conversion table stored in the table information storage section 39R1 corresponding to the input side interface unit 20*b* (in step OP94). For example, in the case, the table information storage section 39R1 stores the "first destination conversion table T1". Therefore, the table selection instruction is transmitted to the selecting portion 38 (in step OP94) that designates the selection of the "second destination conversion table T2" for rewriting the destination information of the forwarding data block having the source information identifying "input side interface unit 20*b*". Upon receiving the table selection instruction, the selecting portion 38 changes a destination conversion table to be used for rewriting the destination information of the forwarding data block having the source information identifying the "input side interface unit 20*b*", from the first destination conversion table T1 to the second destination conversion table T2. The table selecting portion 39 rewrites the table information storage section 39R1 by replacing the information therein identifying the "first destination conversion table T1" with the information identifying the "second destination conversion table T2".

When the output side interface unit 50B has recovered from the failure, the table selecting portion 39 receives a failure recovery notification from the updating section 36 (in step OP90). When a copy of a forwarding data block is received after that (in step OP91), the input side interface unit 20 (or input card) is identified from the source information in the segment header of the forwarding data block (in step OP92). Here, for example, it is assumed here that the source information in the segment header is identifying "input side interface unit 20*b*".

Next, it is determined whether the forwarding data block is the "end" forwarding data block or not on the basis of the positional information in the segment header (in step OP93). When the positional information in the segment header is "beginning" or "middle" (NO in step OP93), the destination conversion table stored in the table information storage section 39R1 corresponding to the input side interface unit 20*b* is selected (in step OP96). Because the table information storage section 39R1 stores the "second destination conversion table T2", for example, the table selection instruction is transmitted to the selecting portion 38 that designates the selection of the "second destination conversion table T2" for rewriting the destination information of the forwarding data block having the source information identifying the "input side interface unit 20*b*".

When the positional information in the segment header is "end" (YES in step OP93), table selecting portion 39 selects the other destination conversion table different from the destination conversion table identified by the table information storage section 39R1 corresponding to the input side interface unit 20*b* (in step OP94). For example, in the case, the table information storage section 39R1 holds the "second destination conversion table T2". Therefore, the table selection instruction is transmitted to the selecting portion 38 that designates the selection of the "first destination conversion table T1" for rewriting the destination information of the forwarding data block having the source information identifying the "input side interface unit 20*b*" (in step OP94). Upon receiving the table selection instruction, the selecting portion 38 changes a destination conversion table to be used for rewriting the destination information of the forwarding data block having the source information identifying the "input side interface unit 20*b*", from the first destination conversion table T2 to the second destination conversion table T1. The table selecting portion 39 rewrites the table information storage section 39R1 by replacing the information therein identifying the "first destination conversion table T2" with the information identifying the "second destination conversion table T1".

The selecting portion 38 selects the forwarding destination information to be used and performs processing of rewriting the destination information, on the basis of the table selection instruction from the table selecting portion 39 and the source information in the segment header. For example, when the table selection instruction from the table selecting portion 39 designates the selection of the second destination conversion table T2 for rewriting the destination information of the forwarding data block having the source information identifying "input side interface unit 20*b*", the selecting portion 38 rewrites, with reference to source information of received forwarding data blocks, only the source information of the forwarding data block that identifies "input side interface unit 20*b*" by selecting the second destination conversion table T2. The destination information of the other forwarding data blocks having the source information identifying an input side interface unit different from the "input side interface unit 20*b*" is rewritten by selecting the first destination conversion table T1.

Here, for example, it is assumed that forwarding data blocks are forwarded to the destination converting section 32 in the order as depicted in FIG. 7. In the case, it is assumed that the selecting portion 38 is selecting the forwarding destination information 1 on the first destination conversion table T1. Therefore, each of the table information storage sections 39R stores "first destination conversion table T1" at this time.

Then, the packet data P1 is forwarded from the input side interface unit 20*a*, the packet data P2 is forwarded from the input side interface unit 20*b*, and the packet data P3 is forwarded from the input side interface unit 20*c*. It is assumed here that all pieces of the packet data P1 to P3 are to be forwarded to the output side interface unit 50B. In the case, the table information storage section 39R0 corresponds to the input interface unit 20*a*, the table information storage section 39R1 corresponds to the input interface unit 20*b*, and the table information storage section 39R2 corresponds to the input interface unit 20*c*.

Further, it is assumed that the table selecting portion 39 receives a failure occurrence notification from the updating section 36 and then receives a copy of the forwarding data block #1-4. Since the forwarding data block #1-4 is the end forwarding data block of the packet data P1, the table selecting portion 39 creates a table selection instruction designating the selection of the "second destination conversion table T2" which is different from one stored in the table information storage section 39R0. Then, the table selecting portion 39 sends to the selecting portion 38 the created table selection instruction designating the use of the second destination conversion table T2 for the forwarding data block having the source information identifying "input side interface unit 20*a*". Upon receiving the table selection instruction, the selecting portion 38 performs processing of rewriting the destination information in the segment header of forwarding data blocks subsequently received from the input side interface unit 20*a*, by replacing the destination information with the forwarding destination information 2 obtained from the second destination conversion table T2.

Next, it is assumed that the table selecting portion 39 has received a copy of the forwarding data block #2-3. Since the forwarding data block #2-3 is a middle forwarding data block of the packet data P2, the table selecting portion 39 creates the table selection instruction designating the selection of the "first destination conversion table T1" which is stored in the table information storage section 39R1. Then, the table selecting portion 39 sends to the selecting portion 38 the created table selection instruction designating the use of the first destination conversion table T1 for the forwarding data block having the source information identifying "input side interface unit 20*b*". Upon receiving the table selection instruction, the selecting portion 38 performs processing of rewriting the destination information in the segment header of forwarding data blocks subsequently received from the input side interface unit 20*b*, by replacing the destination information with the forwarding destination information 1 obtained from the first destination conversion table T1.

As for the forwarding data block #3-3 received next to the forwarding data block #2-3, the similar processing can be performed.

Upon receiving a copy of the forwarding data block #2-4, since the forwarding data block #2-4 is the end forwarding data block of the packet data P2, the table selecting portion 39 creates a table selection instruction designating the selection of the "second destination conversion table T2" which is different from one stored in the table information storage section 39R1. Then, the table selecting portion 39 sends to the selecting portion 38 the created table selection instruction designating the use of the second destination conversion table T2 for the forwarding data block having the source information identifying "input side interface unit 20*b*". Upon receiving the table selection instruction, the selecting portion 38 performs processing of rewriting the destination information in the segment header of forwarding data blocks subsequently received from the input side interface unit 20*b*, by replacing the destination information with the forwarding destination information 2 obtained from the second destination conversion table T2. In the case, since the forwarding data block #2-4 is processed by the selecting portion 38 before the selecting portion 38 receives the table selection instruction designating the use of the second destination conversion table T2, the destination information of the forwarding data block #2-4 is replaced with the forwarding destination information 1 in the first destination conversion table T1.

As for the forwarding data block #3-4 received next to the forwarding data block #2-4, the similar processing can be performed.

In this way, the destination information of the forwarding data blocks of the three pieces of packet data P1 to P3 can be all replaced with the forwarding destination information 1 in the first destination conversion table T1. As a result, all of those forwarding data blocks are forwarded to the output side interface unit 50B. Further, the destination information of the forwarding data blocks of packet data that will be from this time forward received from the input side interface units 20*a* to 20*c* will be replaced with the forwarding destination information 2 in the destination conversion table T2, and the forwarding data blocks will be forwarded to the spare output side interface unit 50PR.

When the output side interface unit 50B has recovered from the failure, the selection of a destination conversion table is changed from the second destination conversion table T2 to the first destination conversion table T1.

According to the third embodiment, the table information storage section 39R is provided for the table selecting portion 39, and the selection of a destination conversion table is controlled on the basis of the information on the destination conversion table that is provided for each of the input side interface units 20. As a result, for each of the plurality of input side interface units 20, switching between the destination conversion tables and changing of the forwarding destination of a sequence of forwarding data blocks can be performed on the packet-by-packet basis, in addition to the operational effects of the first and second embodiments. Further, the third embodiment can reduces the possibility of occurrence of the problem that the forwarding data blocks constituting the same packet, which are to be multiplexed and forwarded by the multiplexing section 31, are forwarded to different output cards and results in the discard of the packet.

Fourth Embodiment

According to the first to third embodiments, the packet switch 10 includes one switch fabric 30. A switch capable of accommodating a high-capacity line can be implemented by providing multiple switch fabrics 30 for a packet switch 10. The descriptions on the parts common to those of the first to third embodiments will be omitted herein, for convenience of explanation.

Figure 10:
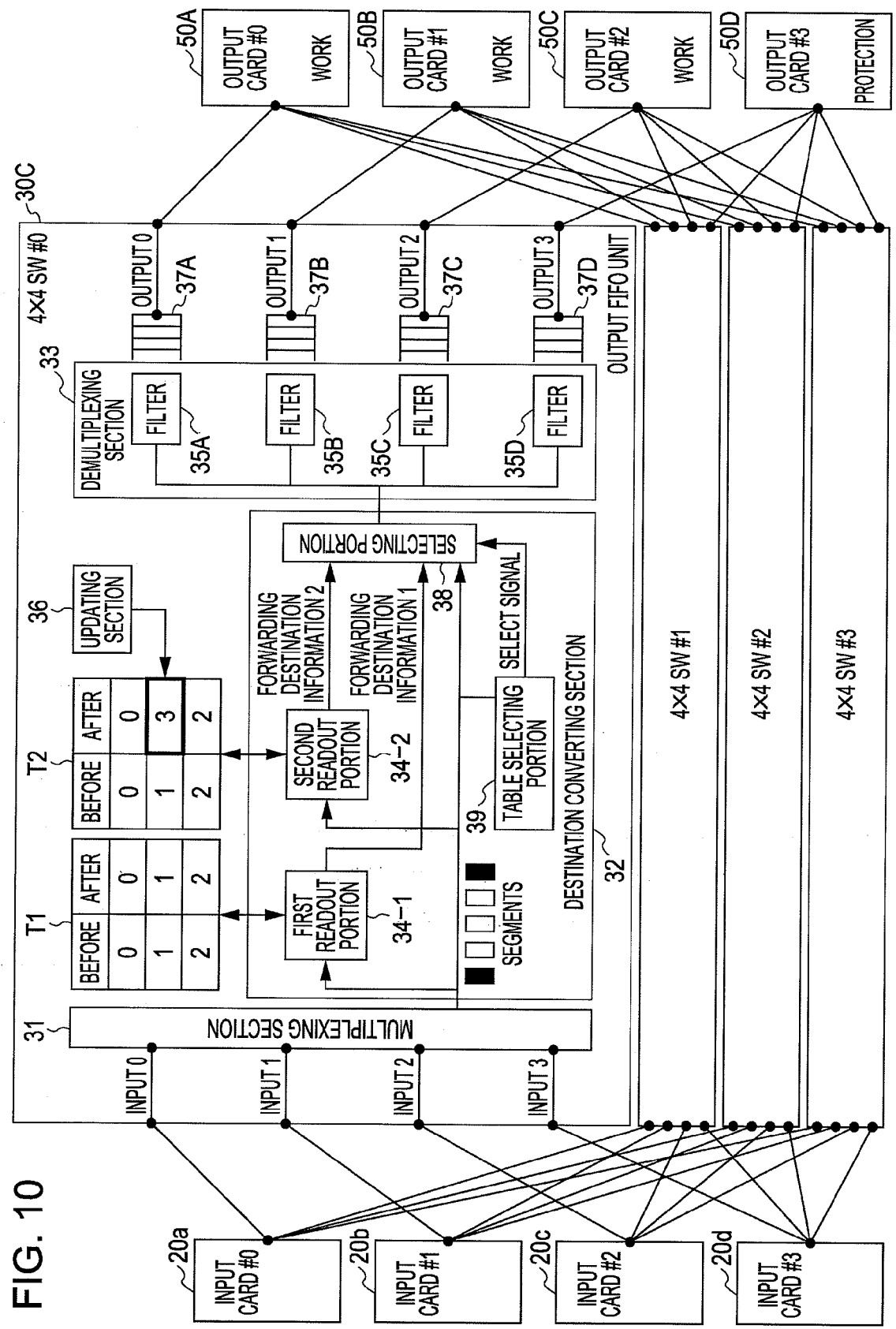
FIG. 10 is a diagram illustrating an example of a packet switch including multiple switching parts, according to the third embodiment.

FIG. 10 is a diagram illustrating an example of a packet switch 10D including multiple switch fabrics 30C of the third embodiment.

The packet switch 10D includes four switch fabrics 30C. The packet switch 10D, for example, can be configured to distribute forwarding data blocks among the multiple switch fabrics 30C in round-robin fashion, and each of the multiple switch fabrics 30C processes the distributed forwarding data blocks. Thus, provided that one switch fabric 30C can forward data at 10 Gbps, the packet switch 10D can have a data forwarding capability of 10 Gbps×4=40 Gbps, allowing significantly fast switching of forwarding data blocks.

However, in a case where the packet switch 10D divides packet data into segments for switching, the distribution of packet data is performed among the multiple switch fabrics 30C on the segment-by-segment basis instead of the packet-by-packet basis. The distribution of a sequence of forwarding data blocks among different switch fabrics 30C on the segment-by-segment basis may cause a failure in identification of forwarding data blocks constituting the same packet. This is because the forwarding data block including "end" as the positional information thereof is transferred to only one of multiple switch fabrics 30C, preventing the other one of the multiple switch fabrics 30C from identifying the end forwarding data block of forwarding data blocks constituting the same packet. Due to the difficulty in identifying the end forwarding data block of a sequence of forwarding data blocks constituting the same packet, the table selecting portion 39 of some of the switch fabrics 30 cannot determine the timing for transmitting a table selection instruction to the selecting portion 38.

A fourth embodiment was made in order to solve the problem as described above. A packet switch 10E of the fourth embodiment includes a table selecting section in each of the input side interface units 20.

Figure 11:
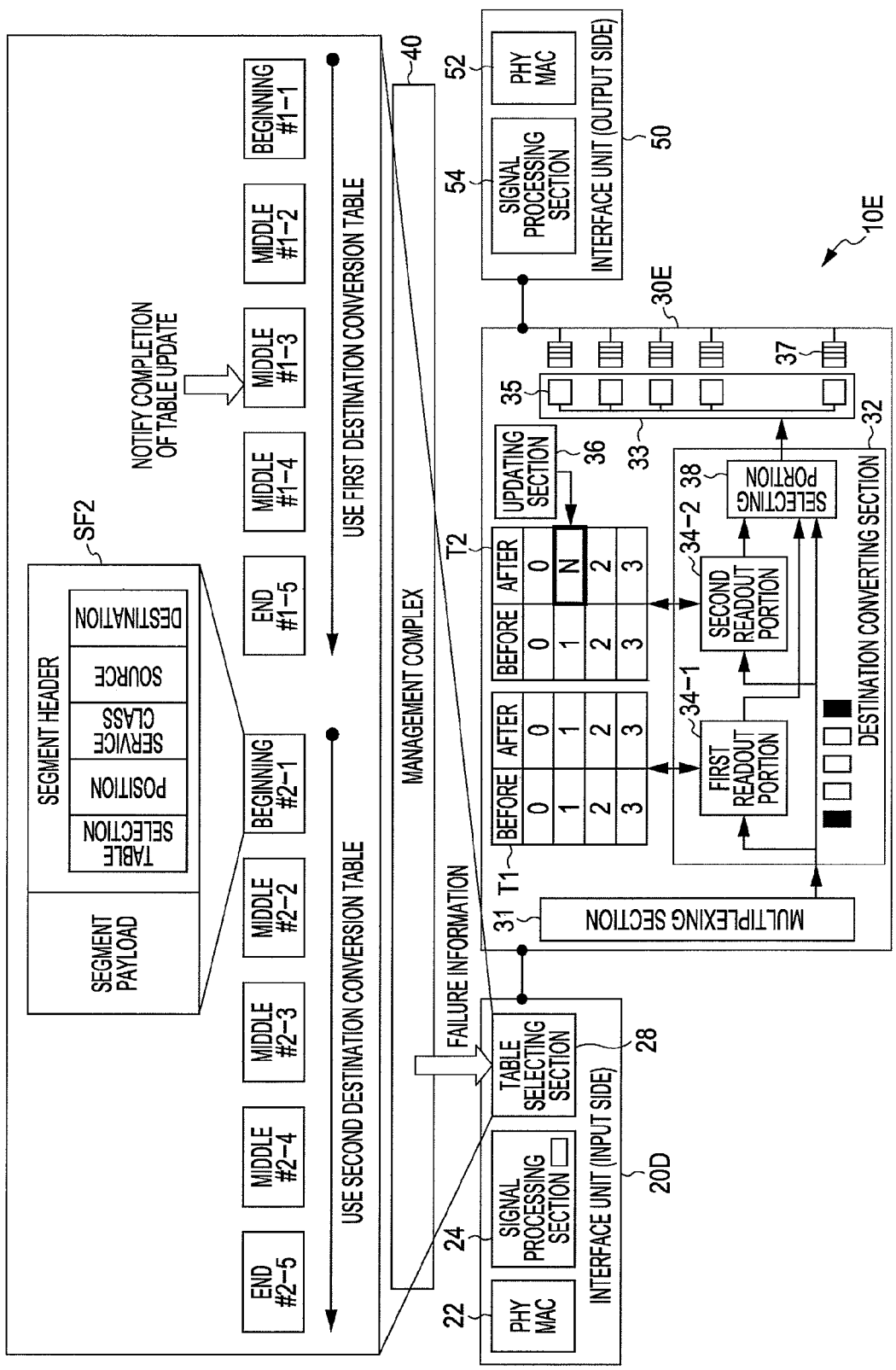
FIG. 11 is a diagram illustrating an example of a packet switch according to a fourth embodiment.

FIG. 11 is a schematic diagram of an example of a packet switch 10E, according to the fourth embodiment. An output side interface unit 20 of the packet switch 10E includes a table selecting section 28.

The table selecting section 28 within the input side interface unit 20 adds table selection information designating the selection of one of the forwarding destination information 1 or 2, to the segment header of each of the forwarding data blocks that are generated by the signal processing section 24, by dividing packet data (refer to SF2 in FIG. 11). The table setting section 28 further identifies "beginning", "middle" or "end" from the positional information of a sequence of forwarding data blocks constituting the packet data. Upon receiving the failure occurrence notification or failure recovery notification from the updating section 36 or upon receiving an instruction from the monitoring/control section 40, the table selecting section 28 changes table selection information that designates the selection of a destination conversion table and is added to each of the sequence of forwarding data blocks constituting the packet data after confirming the completion of forwarding of the end forwarding data block.

A switch fabric 30E includes a multiplexing section 31, a destination converting section 32, a demultiplexing section 33, an output FIFO section 37, and an updating section 36. The destination converting section 32 includes a first readout portion 34-1 that reads out data from the first destination conversion table T1, a second readout portion 34-2 that reads out data from the second destination conversion table T2, and a selecting portion 38. The selecting portion 38 receives forwarding destination information 1 and 2 from the first and second readout portions 34, respectively, and receives forwarding data blocks from the multiplexing section 31. In the case, with reference to the table selection information in the segment header, it is determined which of the forwarding destination information 1 or 2 is to be used for performing processing of rewriting the destination information of the forwarding data block.

For example, when the monitoring/control unit 40, for a management purpose, receives an instruction to change an output side interface unit 50 to which packet data is to be forwarded from the output side interface unit 50B (FIG. 1) to the spare output side interface unit 50PR, the monitoring/control unit 40 sends to the updating section 36 the instruction to update the second destination conversion table T2. Upon completing the update of the second destination conversion table T2, the updating section 36 notifies the table selecting section 28 in the input side interface unit 20 about the completion of the update of the second destination conversion table T2. For example, when the table selecting section 28 receives the notification of the completion of table update during processing of forwarding the forwarding data block #1-3, the table selecting section 28 changes the table selection information included in the segment header thereof after completing the processing of forwarding the end forwarding data block #1-5 (for example, when the first destination conversion table T1 is being used, table selection information is changed from the information identifying the first destination conversion table T1 to the information identifying the second destination conversion table T2).

In this way, since the input card selects a destination conversion table and stores the table selection information identifying the selected destination conversion table into the segment header, and the destination information of the forwarding data block is rewritten by each of the multiple switch fabrics 30E in accordance with the table selection information stored in the segment header, a sequence of forwarding data blocks constituting the same packet data can be all forwarded to the same output side interface unit 50 (or output card) even when the forwarding data blocks are distributed among multiple switch fabrics 30E. Thus, a switching path can be changed without interrupting a service, for example, in the case where no failures are occurring but traffic must be switched temporarily from an in-use card to a spare card for a maintenance reason.

Fifth Embodiment

The case where redundant output side interface units are provided has been described in accordance with the first to fourth embodiments. The similar configuration also can be applicable to the redundancy of units, generally called trunk card or server card (which will be called "trunk unit" or "trunk card" in the description of a fifth embodiment), which can perform various kinds of processing on a packet by allowing the packet to pass through the units when forwarding the packet.

The trunk card, for example, can be a card that may implement a multicast function when there exist no interface units having a multicast function. In the case, the trunk card functions as an output part.

Figure 12A:
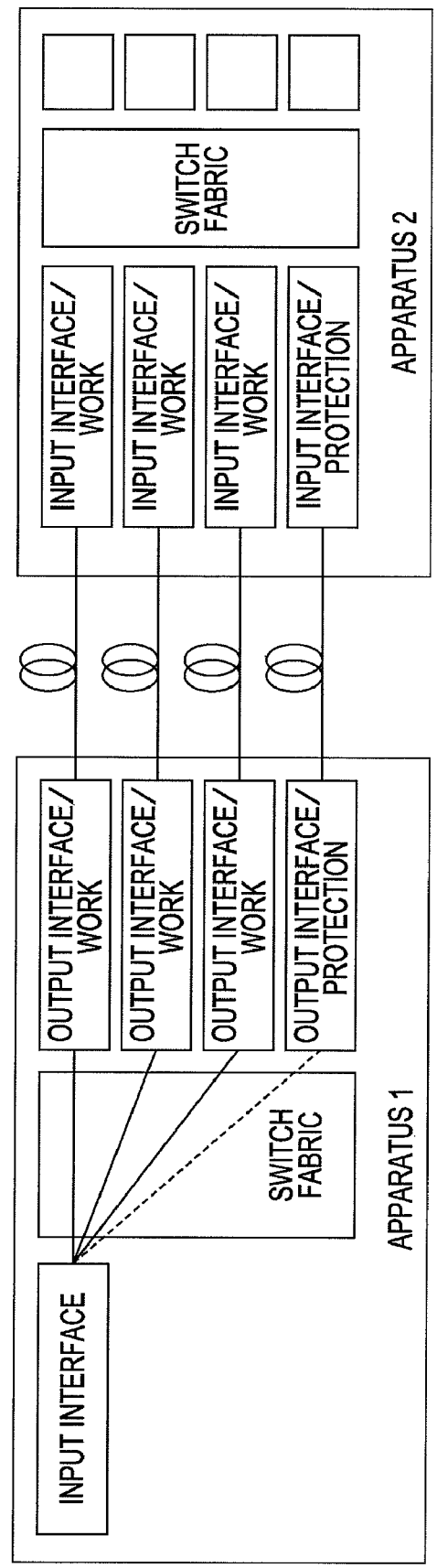
FIG. 12A is a schematic diagram illustrating a 1:N redundant configuration for interface units.
Figure 12B:
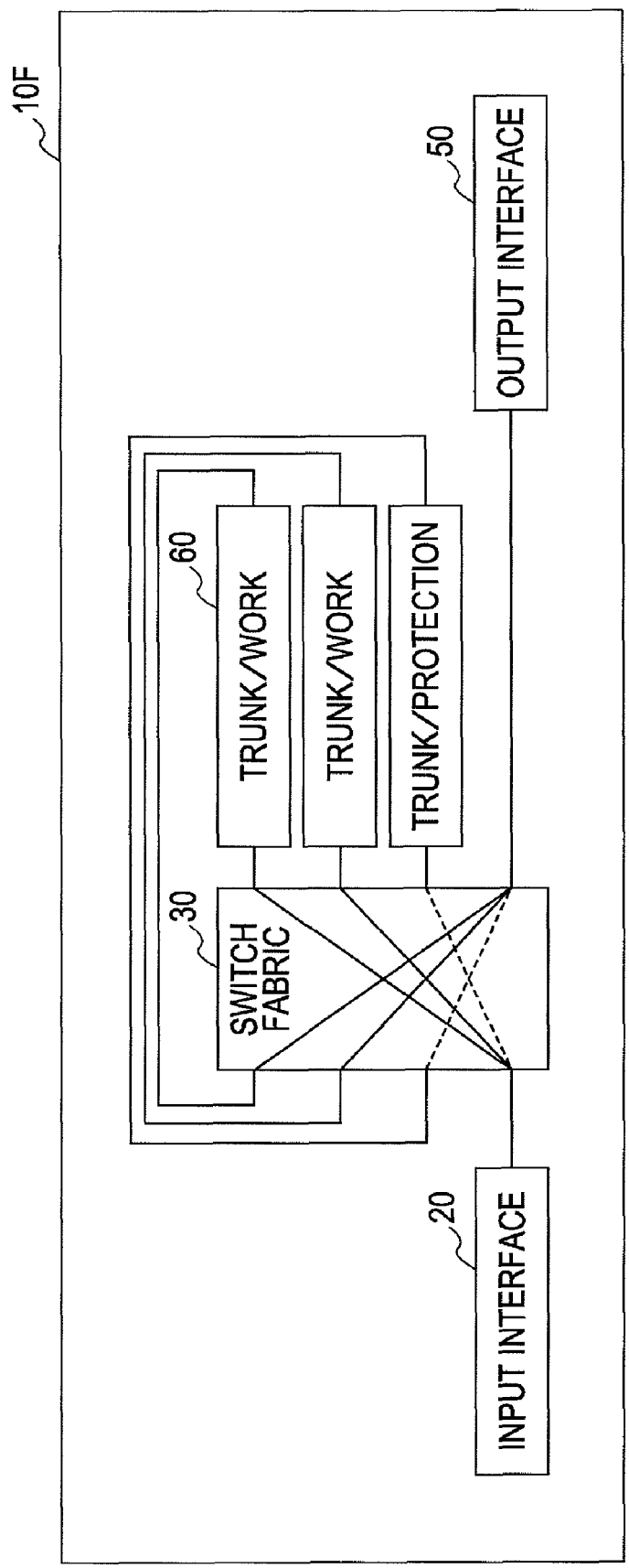
FIG. 12B is a schematic diagram illustrating a 1:N redundant configuration for trunk units.
Figure 13C:
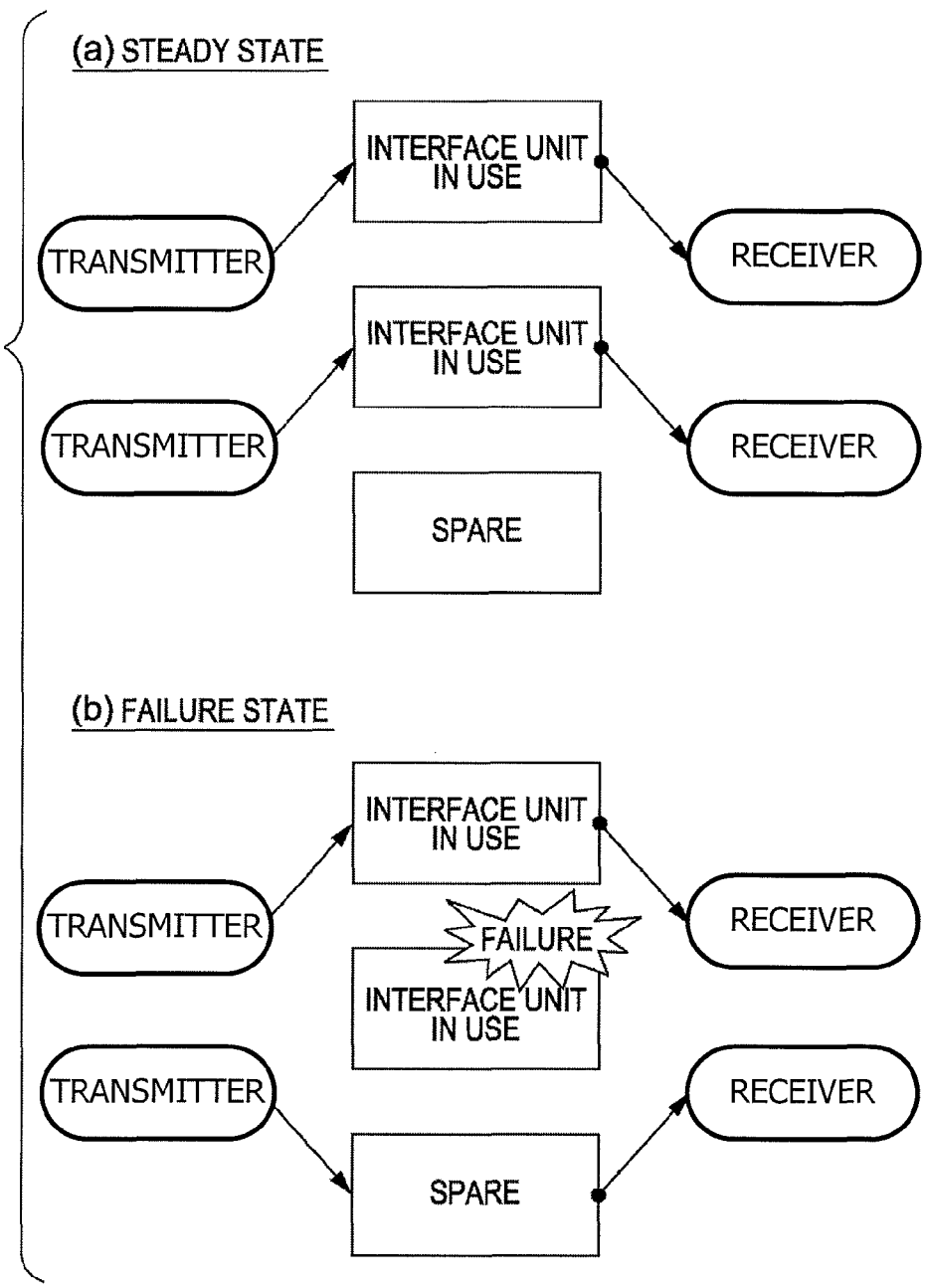
FIG. 13C is a schematic diagram illustrating 1:N redundancy.

FIG. 12A is a diagram illustrating an example of a 1:N redundant configuration for interface units. FIG. 12B is a diagram illustrating an example of a 1:N redundant configuration for trunk units.

A packet switch 10F in FIG. 12B inputs a packet once switched by the switch fabric 30 into a trunk card 60, and again returns the packet from the trunk card 60 into the switch fabric 30 which forwards the packet to an output interface 50.

The input side interface unit 20 sets information identifying the trunk card to which packet data is to be forwarded (which will be called destination trunk card hereinafter) to the internal header (or segment header) of data blocks constituting the packet data. A destination conversion table holds the information identifying a destination trunk card instead of the destination information identifying an output interface card. Upon receiving a packet from the input side interface unit 20, the switch fabric 30 determines the trunk card to which packet data is to be forwarded on the basis of the information identifying the destination trunk card included in the internal header (or segment header) and the destination conversion table, performs processing of rewriting the destination information of the forwarding data block, and forwards the forwarding data block to the destination trunk card. Upon receiving a packet from a trunk card, the switch fabric 30 forwards the forwarding data blocks constituting the packet data thereof to the output side interface unit 50 on the basis of the destination information in the internal header (or segment header). In this way, by changing the configurations of the first to third embodiments, the 1:N redundant configuration for the output side interfaces can be also applied to the 1:N redundancy for trunk cards.

What is claimed is:

1. An apparatus for forwarding packet data, comprising:
a plurality of output parts for outputting a packet, each of the plurality of output parts being defined as one of an output side interface unit and a trunk unit;
an input side interface unit configured to:
  input a packet, and
  build a sequence of forwarding data blocks each having a header field and a packet data field, the header field including a forwarding destination field and a position indicator, the forwarding destination field storing a first forwarding destination identifier identifying a first output part to which the sequence of forwarding data blocks are to be forwarded when the first output part is in an active state indicating that the first output part is working, the position indicator indicating a relative position of a forwarding data block within the sequence of forwarding data blocks, the packet data field storing a portion of packet data extracted from the packet so that the packet data is restored by combining all of the packet data fields included in the sequence of forwarding data blocks in an order corresponding to the sequence of forwarding data blocks; and
a switch fabric configured to:
  store a second forwarding destination identifier in association with the first forwarding destination identifier when the first output part is in an inactive state indicating that the first output part is not working, the second forwarding destination identifier identifying a second output part to which the sequence of forwarding data blocks are to be forwarded when the first output part is in the inactive state;
  receive the sequence of forwarding data blocks from the input side interface unit;
  perform forwarding destination conversion procedure on the received sequence of forwarding data blocks, the forwarding destination conversion procedure including:
    determining whether the first output part is in the active state or not when the switch fabric receives a beginning block of the sequence of forwarding data blocks,
    converting, when it is determined that the first output part is in the inactive state, the first forwarding destination identifier stored in the forwarding destination field of each of the sequence of forwarding data blocks into the second forwarding destination identifier so that all the forwarding destination fields of the sequence of forwarding data blocks store the second forwarding destination identifier, and
    keeping, when it is determined that the first output part is in the active state, the first forwarding destination identifier stored in the forwarding destination field of each of the sequence of forwarding data blocks so that all the forwarding destination fields of the sequence of forwarding data blocks store the first forwarding destination identifier; and
  forward each of the sequence of forwarding data blocks to one of the first and second output parts that is identified by the converted forwarding destination identifier stored in the forwarding destination field of the each of the sequence of forwarding data blocks so that a whole sequence of forwarding data blocks is forwarded to the first output part when the first output part is in the active state at the time of receiving the beginning block of the sequence of forwarding data blocks, and forwarded to the second output part when the first output part is in the inactive state at the time of receiving the beginning block of the sequence of forwarding data blocks.

2. The apparatus of claim 1, wherein
the switch fabric includes first and second forwarding destination tables, the first forwarding destination table storing, in association with the first forwarding destination identifier, the same first forwarding destination identifier, the second destination table storing, in association with the first forwarding destination identifier, the second forwarding destination identifier; and
the switch fabric performs the forwarding destination conversion procedure on the received sequence of forwarding data blocks by:
  selecting the first forwarding destination table when the first output part is in the active state at the time of receiving the beginning block of the sequence of forwarding data blocks;
  selecting the second forwarding destination table when the first output part is in the inactive state at the time of receiving the beginning block of the sequence of forwarding data blocks;
  obtaining a forwarding destination identifier that is associated with the first forwarding destination identifier in the selected forwarding destination table; and
  converting the first forwarding destination identifier stored in the forwarding destination field of each of the sequence of forwarding data blocks into the obtained forwarding destination identifier so that all the forwarding destination fields of the sequence of forwarding data blocks store the obtained forwarding destination identifier.

3. The apparatus of claim 2, wherein
the apparatus includes a plurality of input side interface units, each of the plurality of input side interface units providing a header field of each of the sequence of data blocks with a source identifier identifying the each of the plurality of input side interface units so that all the header fields of the sequence of data blocks include a same source identifier provided by the each of the plurality of input side interface units; and
upon receiving a plurality of the sequences of forwarding data blocks in parallel from the plurality of input side interface units, the switch fabric performs the forwarding destination conversion procedure in parallel on each of the plurality of the sequences of data blocks with reference to the source identifiers included in the header fields of the each of the plurality of sequences of forwarding data blocks received from the plurality of input side interface units, so that all of the sequence of forwarding data blocks originating from one of the plurality of input side interface units are forwarded to a same one of the plurality of output parts that is identified by the converted forwarding destination identifier stored in the forwarding destination fields of the sequence of forwarding data blocks.

4. The apparatus of claim 1, wherein
the apparatus includes a plurality of the switch fabrics;
the input side interface unit distributes the sequence of forwarding data blocks among the plurality of the switch fabrics; and
each of the plurality of the switch fabrics performs the forwarding destination conversion procedure on at least one forwarding data block received from the input side interface unit, and forwards the at least one forwarding data block to one of the plurality of output parts that is identified by the converted forwarding destination identifier included in the forwarding destination field of the received at least one forwarding data block.

5. The apparatus of claim 2, wherein
the apparatus includes a plurality of the switch fabrics;
the input side interface unit selects one of the first and second forwarding destination tables, and provides all the header fields of the sequence of forwarding data blocks with a table identifier identifying the selected one of the first and second forwarding destination tables, and distributes the sequence of forwarding data blocks among the plurality of switch fabrics; and
each of the plurality of switch fabrics performs the forwarding destination conversion procedure on at least one forwarding data block received from the input side interface unit, by converting the first forwarding destination identifier stored in the header field of the received at least one forwarding data block into the converted forwarding destination identifier that is associated with the first forwarding destination identifier by one of the first and second forwarding destination tables that is identified by the table identifier included in the header field of the received at least one forwarding data block, so that all the sequence of forwarding data blocks including the received at least one forwarding data block are forwarded to a same one of the plurality of output parts that is identified by the converted forwarding destination identifier stored in each of the forwarding destination fields of the sequence of forwarding data blocks.

6. The apparatus of claim 2, wherein
the switch fabric includes first and second forwarding destination tables, both the first and second forwarding destination tables storing, in association with the first forwarding destination identifier, one of the first and second forwarding destination identifiers when no changes are occurring in operating states of the plurality of output parts;
the switch fabric performs the forwarding destination conversion procedure on the sequence of forwarding data blocks by selecting the one of the first and second forwarding destination tables;
the switch fabric updates, in response to a change in an operating state of the plurality of output parts, the other one of the first and second forwarding destination tables that is not being selected so that the other one of the first and second forwarding destination tables stores, in association with the first forwarding destination identifier, the first forwarding destination identifier when the first output part is in the active state, and stores, in association with the first forwarding destination identifier, the second forwarding destination identifier when the first output part is in the inactive state; and
the switch fabric further updates the one of the first and second forwarding destination tables after selecting the other one of the first and second forwarding destination tables so that both the first and second forwarding destination tables store a same one of the first and second forwarding destination identifiers in association with the first forwarding destination identifiers.

7. A method for forwarding packet data within an apparatus including an input side interface unit, a switch fabric, and a plurality of output parts each defined as one of an output side interface unit and a trunk unit, the method comprising:
inputting, by the input side interface unit, a packet;
building, by the input side interface unit, from the inputted packet, a sequence of forwarding data blocks each having a header field and a packet data field, the header field including a forwarding destination field and a position indicator, the forwarding destination field storing a first forwarding destination identifier identifying a first output part to which the sequence of forwarding data blocks are to be forwarded when the first output part is in an active state indicating that the first output part is working, the position indicator indicating a relative position of a forwarding data block within the sequence of forwarding data blocks, the packet data field storing a portion of packet data extracted from the packet so that the packet data is restored by combining all of the packet data fields included in the sequence of forwarding data blocks in an order corresponding to the sequence of forwarding data blocks
storing, by the switch fabric, a second forwarding destination identifier in association with the first forwarding destination identifier when the first output part is in an inactive state indicating that the first output part is not working, the second forwarding destination identifier identifying a second output part to which the sequence of forwarding data blocks are to be forwarded when the first output part is in the inactive state,
receiving, by the switch fabric, the sequence of forwarding data blocks from the input side interface unit;
performing, by the switch fabric, forwarding destination conversion procedure on the received sequence of forwarding data blocks, the forwarding destination conversion procedure including:
  determining whether the first output part is in the active state or not when the switch fabric receives a beginning block of the sequence of forwarding data blocks,
  converting, when it is determined that the first output part is in the inactive state, the first forwarding destination identifier stored in the forwarding destination field of each of the sequence of forwarding data blocks into the second forwarding destination identifier so that all the forwarding destination fields of the sequence of forwarding data blocks store the second forwarding destination identifier, and
  keeping, when it is determined that the first output part is in the active state, the first forwarding destination identifier stored in the forwarding destination field of each of the sequence of forwarding data blocks so that all the forwarding destination fields of the sequence of forwarding data blocks store the first forwarding destination identifier; and
forwarding, by the switch fabric, each of the sequence of forwarding data blocks to one of the first and second output parts that is identified by the converted forwarding destination identifier stored in the forwarding destination field of the each of the sequence of forwarding data blocks so that a whole sequence of forwarding data blocks is forwarded to the first output part when the first output part is in the active state at the time of receiving the beginning block of the sequence of forwarding blocks, and forwarded to the second output part being in the active state when the first output part is in the inactive state at the time of receiving the beginning block of the sequence of forwarding blocks.

8. The method of claim 7, further comprising:

providing the switch fabric with first and second forwarding destination tables, the first forwarding destination table storing, in association with the first forwarding destination identifier, the same first forwarding destination identifier, the second forwarding destination table storing, in association with the first forwarding destination identifier, the second forwarding destination identifier, wherein the forwarding destination conversion procedure includes:
- selecting the first forwarding destination table when the first output part is in the active state at the time of receiving the beginning block of the sequence of forwarding data blocks;
- selecting the second forwarding destination table when the first output part is in the inactive state at the time of receiving the beginning block of the sequence of forwarding data blocks;
- obtaining, by the switch fabric, a forwarding destination identifier that is associated with the first forwarding destination identifier in the selected forwarding destination tables; and
- converting the first forwarding destination identifier stored in the forwarding destination field of each of the sequence of forwarding data blocks into the obtained forwarding destination identifier so that all the forwarding destination fields of the sequence of forwarding data blocks store the obtained forwarding destination identifier.

9. The method of claim 8, further comprising:

providing the apparatus with a plurality of input side interface units;

inputting, by each of the plurality of input side interface units, the packet;

providing, by the each of the plurality of input side interface units, a header field of each of the sequence of data blocks with a source identifier identifying the each of the plurality of input side interface units so that all the header fields of the sequence of data blocks include the same source identifier provided by the each of the plurality of input side interface units;

performing, upon receiving a plurality of the sequences of forwarding data blocks in parallel from the plurality of input side interface units, the forwarding destination conversion procedure in parallel on each of the plurality of the sequences of forwarding data blocks with reference to a source identifier included in the header fields of each of the plurality of the sequences of forwarding data blocks, so that all the sequence of forwarding data blocks originating from one of the plurality of input side interface units are forwarded to a same one of the plurality of output parts that is identified by the converted forwarding destination identifier stored in the forwarding destination fields of the sequence of forwarding data blocks.

10. The method of claim 7, further comprising:

providing the switch fabric with first and second forwarding destination tables, both the first and second forwarding destination tables storing, in association with the first forwarding destination identifier, one of the first and second forwarding destination identifiers when no changes are occurring in operating states of the plurality of output parts;

performing, by the switch fabric, the forwarding destination conversion procedure on the sequence of forwarding data blocks by selecting one of the first and second forwarding destination tables;

updating, in response to a change in an operating state of the plurality of output parts, the other one of the first and second forwarding destination tables that is not being selected so that the other one of the first and second forwarding destination tables stores, in association with the first forwarding destination identifier, the first forwarding destination identifier when the first output part is in the active state, and stores, in association with the first forwarding destination identifier, the second forwarding destination identifier when the first output part is in the inactive state; and updating the one of the first and second forwarding destination tables after selecting the other one of the first and second forwarding destination tables, so that both the first and second forwarding destination tables store a same one of the first and second forwarding destination identifiers in association with the first forwarding destination identifiers.

* * * * *